(12) United States Patent
Huang et al.

(10) Patent No.: US 11,935,180 B2
(45) Date of Patent: Mar. 19, 2024

(54) DUAL IMU SLAM

(71) Applicant: Magic Leap, Inc., Plantation, FL (US)

(72) Inventors: Yu-Hsiang Huang, Mountain View, CA (US); Evan Gregory Levine, Mountain View, CA (US); Igor Napolskikh, San Francisco, CA (US); Dominik Michael Kasper, Zurich (CH); Manel Quim Sanchez Nicuesa, Zurich (CH); Sergiu Sima, Effretikon (CH); Benjamin Langmann, Zurich (CH); Ashwin Swaminathan, Dublin, CA (US); Martin Georg Zahnert, Zurich (CH); Blazej Marek Czuprynski, Zurich (CH); Joao Antonio Pereira Faro, Lausanne (CH); Christoph Tobler, Zurich (CH); Omid Ghasemalizadeh, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 77 days.

(21) Appl. No.: 17/715,880

(22) Filed: Apr. 7, 2022

(65) Prior Publication Data

US 2022/0230382 A1     Jul. 21, 2022

Related U.S. Application Data

(63) Continuation of application No. 17/072,825, filed on Oct. 16, 2020, now Pat. No. 11,328,475.
(Continued)

(51) Int. Cl.
*G06T 15/20* (2011.01)
*G01C 19/00* (2013.01)
(Continued)

(52) U.S. Cl.
CPC ............ *G06T 15/20* (2013.01); *G01C 19/00* (2013.01); *G01P 7/00* (2013.01); *G01P 13/00* (2013.01);
(Continued)

(58) Field of Classification Search
CPC ....... G06T 15/20; G06T 19/006; G01C 19/00; G01P 7/00; G01P 13/00; G01P 15/08; G01P 15/00; G06F 3/011; G06F 3/012
See application file for complete search history.

(56) References Cited

U.S. PATENT DOCUMENTS

| 4,852,988 A | 8/1989 | Velez |
| 5,933,125 A | 8/1999 | Fernie et al. |

(Continued)

FOREIGN PATENT DOCUMENTS

| CA | 2316473 A1 | 1/2001 |
| CA | 2362895 A1 | 12/2002 |

(Continued)

OTHER PUBLICATIONS

Chow, J.C.K., Lichti, D.D., Hol, J.D., Bellusci, G., Luinge, H., "IMU and multiple RGB-D camera fusion for assisting indoor stop-and-go 3D terrestrial laser scanning", Robotics 3, p. 247-280. doi.org/10.3390/robotics3030247 (Year: 2014).*

(Continued)

*Primary Examiner* — Chong Wu
(74) *Attorney, Agent, or Firm* — Morrison & Foerster LLP

(57) ABSTRACT

Examples of the disclosure describe systems and methods for presenting virtual content on a wearable head device. In some embodiments, a state of a wearable head device is determined by minimizing a total error based on a reduced weight associated with a reprojection error. A view reflecting the determined state of the wearable head device is pre-
(Continued)

sented via a display of the wearable head device. In some embodiments, a wearable head device calculates a preintegration term based on the image data received via a sensor of the wearable head device and the inertial data received via a first IMU and a second IMU of the wearable head device. The wearable head device estimates a position of the device based on the preintegration term, and the wearable head device presents the virtual content based on the position of the device.

20 Claims, 17 Drawing Sheets

Related U.S. Application Data

(60) Provisional application No. 63/076,251, filed on Sep. 9, 2020, provisional application No. 62/923,317, filed on Oct. 18, 2019.

(51) Int. Cl.
| | |
|---|---|
| *G01P 7/00* | (2006.01) |
| *G01P 13/00* | (2006.01) |
| *G01P 15/08* | (2006.01) |
| *G06F 3/01* | (2006.01) |
| *G06T 19/00* | (2011.01) |

(52) U.S. Cl.
CPC .............. *G01P 15/08* (2013.01); *G06F 3/011* (2013.01); *G06T 19/006* (2013.01)

(56) References Cited

U.S. PATENT DOCUMENTS

| | | | |
|---|---|---|---|
| 6,433,760 B1 | 8/2002 | Vaissie | |
| 6,491,391 B1 | 12/2002 | Blum et al. | |
| 6,847,336 B1 | 1/2005 | Lemelson | |
| 6,943,754 B2 | 9/2005 | Aughey | |
| 6,977,776 B2 | 12/2005 | Volkenandt et al. | |
| 7,347,551 B2 | 3/2008 | Fergason et al. | |
| 7,488,294 B2 | 2/2009 | Torch | |
| 8,235,529 B1 | 8/2012 | Raffle | |
| 8,611,015 B2 | 12/2013 | Wheeler | |
| 8,638,498 B2 | 1/2014 | Bohn et al. | |
| 8,696,113 B2 | 4/2014 | Lewis | |
| 8,733,927 B1 | 5/2014 | Lewis | |
| 8,733,928 B1 | 5/2014 | Lewis | |
| 8,929,589 B2 | 1/2015 | Publicover et al. | |
| 9,010,929 B2 | 4/2015 | Lewis | |
| 9,274,338 B2 | 3/2016 | Robbins et al. | |
| 9,292,973 B2 | 3/2016 | Bar-zeev et al. | |
| 9,323,325 B2 | 4/2016 | Perez et al. | |
| 9,658,473 B2 | 5/2017 | Lewis | |
| 9,720,505 B2 | 8/2017 | Gribetz et al. | |
| 10,013,053 B2 | 7/2018 | Cederlund et al. | |
| 10,025,379 B2 | 7/2018 | Drake et al. | |
| 10,185,147 B2 | 1/2019 | Lewis | |
| 11,221,814 B2 | 1/2022 | Browy | |
| 11,328,475 B2 | 5/2022 | Huang et al. | |
| 11,455,137 B2 | 9/2022 | Browy | |
| 11,561,613 B2 * | 1/2023 | Franci Rodon | G06F 3/011 |
| 2003/0030597 A1 | 2/2003 | Geist | |
| 2006/0023158 A1 | 2/2006 | Howell et al. | |
| 2006/0185432 A1 | 8/2006 | Weinberg | |
| 2011/0211056 A1 | 9/2011 | Publicover et al. | |
| 2011/0213664 A1 | 9/2011 | Osterhout | |
| 2012/0021806 A1 | 1/2012 | Maltz | |
| 2012/0078570 A1 | 3/2012 | Rothkopf et al. | |
| 2013/0077147 A1 | 3/2013 | Efimov | |
| 2013/0278631 A1 | 10/2013 | Border | |
| 2014/0139621 A1 | 5/2014 | Shinozaki et al. | |
| 2014/0195918 A1 | 7/2014 | Friedlander | |
| 2015/0168731 A1 | 6/2015 | Robbins | |
| 2016/0295038 A1 | 10/2016 | Rao | |
| 2016/0364013 A1 | 12/2016 | Katz et al. | |
| 2016/0364904 A1 | 12/2016 | Parker et al. | |
| 2017/0084074 A1 | 3/2017 | Hwang | |
| 2017/0153672 A1 | 6/2017 | Shin | |
| 2017/0270715 A1 | 9/2017 | Lindsay | |
| 2017/0282062 A1 | 10/2017 | Black | |
| 2017/0307333 A1 | 10/2017 | Northrup | |
| 2018/0053056 A1 | 2/2018 | Rabinovich et al. | |
| 2018/0144649 A1 | 5/2018 | El Kaliouby | |
| 2018/0158197 A1 | 6/2018 | Dasgupta | |
| 2018/0231385 A1 * | 8/2018 | Fourie | G01C 21/188 |
| 2018/0293756 A1 | 10/2018 | Liu et al. | |
| 2018/0319495 A1 | 11/2018 | Tu | |
| 2019/0096081 A1 | 3/2019 | Gupta | |
| 2019/0113347 A1 | 4/2019 | Kim | |
| 2019/0130639 A1 | 5/2019 | Boyce | |
| 2019/0197196 A1 | 6/2019 | Yang | |
| 2019/0227693 A1 | 7/2019 | Liao | |
| 2020/0039522 A1 | 2/2020 | Nakaoka et al. | |
| 2020/0045289 A1 | 2/2020 | Raziel et al. | |
| 2021/0118218 A1 | 4/2021 | Huang et al. | |
| 2021/0373654 A1 | 12/2021 | Franci Rodon et al. | |
| 2022/0261200 A1 | 8/2022 | Browy | |
| 2022/0405035 A1 | 12/2022 | Browy | |
| 2023/0126026 A1 | 4/2023 | Franci Rodon et al. | |

FOREIGN PATENT DOCUMENTS

| | | |
|---|---|---|
| CA | 2388766 A1 | 12/2003 |
| CN | 206096621 U | 4/2017 |
| EP | 3428760 A1 | 1/2019 |
| WO | 2019164498 A1 | 8/2019 |
| WO | 2020140078 A1 | 7/2020 |
| WO | 2021243103 A1 | 12/2021 |

OTHER PUBLICATIONS

European Search Report dated Nov. 7, 2022, for EP Application No. 20875999.3, eight pages.

Non-Final Office Action dated Dec. 5, 2022, for U.S. Appl. No. 17/893,085, filed Aug. 22, 2022, ten pages.

Jacob, R. "Eye Tracking in Advanced Interface Design", Virtual Environments and Advanced Interface Design, Oxford University Press, Inc. (Jun. 1995).

Rolland, J. et al., "High- resolution inset head- mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

Notice of Allowance dated Jul. 22, 2022, for U.S. Appl. No. 17/541,095, filed Dec. 2, 2021, nine pages.

International Preliminary Report and Written Opinion dated Dec. 8, 2022, for PCT Application No. PCT/US2021/34647, filed May 27, 2021, seven pages.

Final Office Action dated May 19, 2023, for U.S. Appl. No. 17/893,085, filed Aug. 22, 2022, eleven pages.

Notice of Allowance dated Nov. 17, 2022, for U.S. Appl. No. 17/332,917, filed May 27, 2021, five 1 pages.

International Preliminary Report on Patentability and Written Opinion dated Apr. 28, 2022, for PCT Application No. PCTUS2020/056163, filed Oct. 16, 2020, eight pages.

Non-Final Office Action dated May 20, 2022, for U.S. Appl. No. 17/332,917, filed May 27, 2021, nine pages.

Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf, retrieved on Oct. 26, 2020.

(56) References Cited

OTHER PUBLICATIONS

Azuma, Ronald T. (Feb. 1995), "Predictive Tracking for Augmented Reality," Department of Computer Science, UNC-Chapel Hill, Chapel Hill, NC, 262 pages.
Bimber, Oliver et al. (2005). "Spatial Augmented Reality: Merging Real and Virtual Worlds," A. K. Peters, Ltd., Wellesley, MA.
European Search Report dated Feb. 1, 2022, for EP Application No. 19903486.9, nine pages.
Final Office Action dated Feb. 8, 2021, for U.S. Appl. No. 16/729,192, filed Dec. 27, 2019, eight pages.
International Preliminary Report and Written Opinion dated Jul. 8, 2021, for PCT Application No. PCT/US2019/068812, filed Dec. 27, 2019, seven pages.
International Search Report and Written Opinion dated Aug. 31, 2021, for PCT Application No. PCT/US2021/34647, filed May 27, 2021, 13 pages.
International Search Report and Written Opinion dated Jan. 21, 2021, for PCT Application No. PCT/US20/56163, filed Oct. 16, 2020, thirteen pages.
International Search Report and Written Opinion dated Mar. 12, 2020, for PCT Application No. PCT/US19/68812, filed Dec. 27, 2019, seven five pages.
Non-Final Office Action dated May 25, 2021, for U.S. Appl. No. 16/729,192, filed Dec. 27, 2019, ten pages.
Non-Final Office Action dated Nov. 24, 2021, for U.S. Appl. No. 17/072,825, filed Oct. 16, 2020, six pages.
Non-Final Office Action dated Sep. 16, 2020 for U.S. Appl. No. 16/729,192, filed Dec. 27, 2019, seven pages.
Notice of Allowance dated Mar. 22, 2022, for U.S. Appl. No. 17/072,825, filed Oct. 16, 2020, nine pages.
Notice of Allowance dated Sep. 7, 2021, for U.S. Appl. No. 16/729,192, filed Dec. 27, 2019, eight pages.
Notice of Allowance (corrected) dated Aug. 23, 2022, for U.S. Appl. No. 17/541,095, filed Dec. 2, 2021, three pages.
Non-Final Office Action dated Oct. 12, 2023, for U.S. Appl. No. 18/068,392, filed Dec. 19, 2022, seventeen pages.
Notice of Allowance dated Sep. 13, 2023, for U.S. Appl. No. 17/893,085, filed Aug. 22, 2022, nine pages.
Chinese Office Action dated Nov. 20, 2023, for CN Patent Application No. 201980093010.5, with English translation, twelve pages.
European Search Report dated Oct. 13, 2023, for EP Application No. 21813271.0, thirteen pages.
Lin, Pei-Chun et al. (Aug. 1, 2012). "Design and Implementation of a Nine-Axis Inertial Measurement Unit", IEEE/ASME Transactions On Mechatronics, IEEE Service Center, Piscataway, NJ, US, vol. 17, No. 4, pp. 657-668.
Ohta, Ken, et al: (Mar. 1, 1994). "Measurement of Angular Velocity and Angular Acceleration in Sports Using Accelerometers", Transactions of the Society of Instrument and Control Engineers, vol. 30, No. 12, pp. 1442-1448, Retrieved from the Internet: URL:https://www.jstage.jst.go.jp/article/sicetr1965/30/12/30_12_1442/_pdf/-char/en on Oct. 5, 2023.
Yokokohji Y, et al. (Mar. 18, 2000). "Accurate Image Overlay On Video See-Through HMDs Using Vision And Accelerometers", Proceedings IEEE 2000, Virtual Reality, (VR2000). New Brunswick, NJ, Los Alamitos, CA, IEEE Comp. Soc, US, pp. 247-254.

\* cited by examiner

DUAL IMU SLAM

CROSS REFERENCE TO RELATED APPLICATIONS

This application is a continuation of U.S. Non-Provisional application Ser. No. 17/072,825, filed on Oct. 16, 2020, which claims the benefit of U.S. Provisional Application No. 62/923,317, filed on Oct. 18, 2019, and U.S. Provisional Application No. 63/076,251, filed on Sep. 9, 2020, the entire disclosure of which are herein incorporated by reference for all purposes.

FIELD

This disclosure relates in general to systems and methods for mapping and displaying visual information, and in particular to systems and methods for mapping and displaying visual information in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

Presenting a virtual environment that overlaps or overlays the real environment can be difficult. For example, mixing a virtual environment with a real environment can require a complex and thorough understanding of the real environment such that objects in the virtual environment do not conflict with objects in the real environment. It can further be desirable to maintain a persistency in the virtual environment that corresponds with a consistency in the real environment. For example, it can be desirable for a virtual object displayed on a physical table to appear at the same location even if a user looks away, moves around, and then looks back at the physical table. To achieve this type of immersion, it can be beneficial to develop an accurate and precise estimate of where objects are in the real world and where a user is in the real world.

BRIEF SUMMARY

Examples of the disclosure describe systems and methods for presenting virtual content on a wearable head device. For example, systems and methods for performing visual-inertial odometry with gravity estimations and bundle adjustments are disclosed. In some embodiments, a first sensor data indicative of a first feature in a first position is received via a sensor of a wearable head device. A second sensor data indicative of the first feature in a second position is received via the sensor. Inertial measurements are received via an inertial measurement unit on the wearable head device. A velocity is determined based on the inertial measurements. A third position of the first feature is estimated based on the first position and the velocity. A reprojection error is determined based on the third position and the second position. A weight associated with the reprojection error is reduced. A state of the wearable head device is determined. Determining the state includes minimizing a total error, and the total error is based on the reduced weight associated with the reprojection error. A view reflecting the determined state of the wearable head device is presented via a display of the wearable head device.

In some embodiments, the wearable head device receives, via a sensor of the wearable head device, image data. The wearable head device receives, via a first inertial measurement unit (IMU) and a second IMU, first and second inertial data, respectively. The wearable head device calculates a preintegration term based on the image data and the inertial data. The wearable head device estimates a position of the device based on the preintegration term. Based on the position of the device, the wearable head device presents the virtual content.

DETAILED DESCRIPTION

Figure 1A:
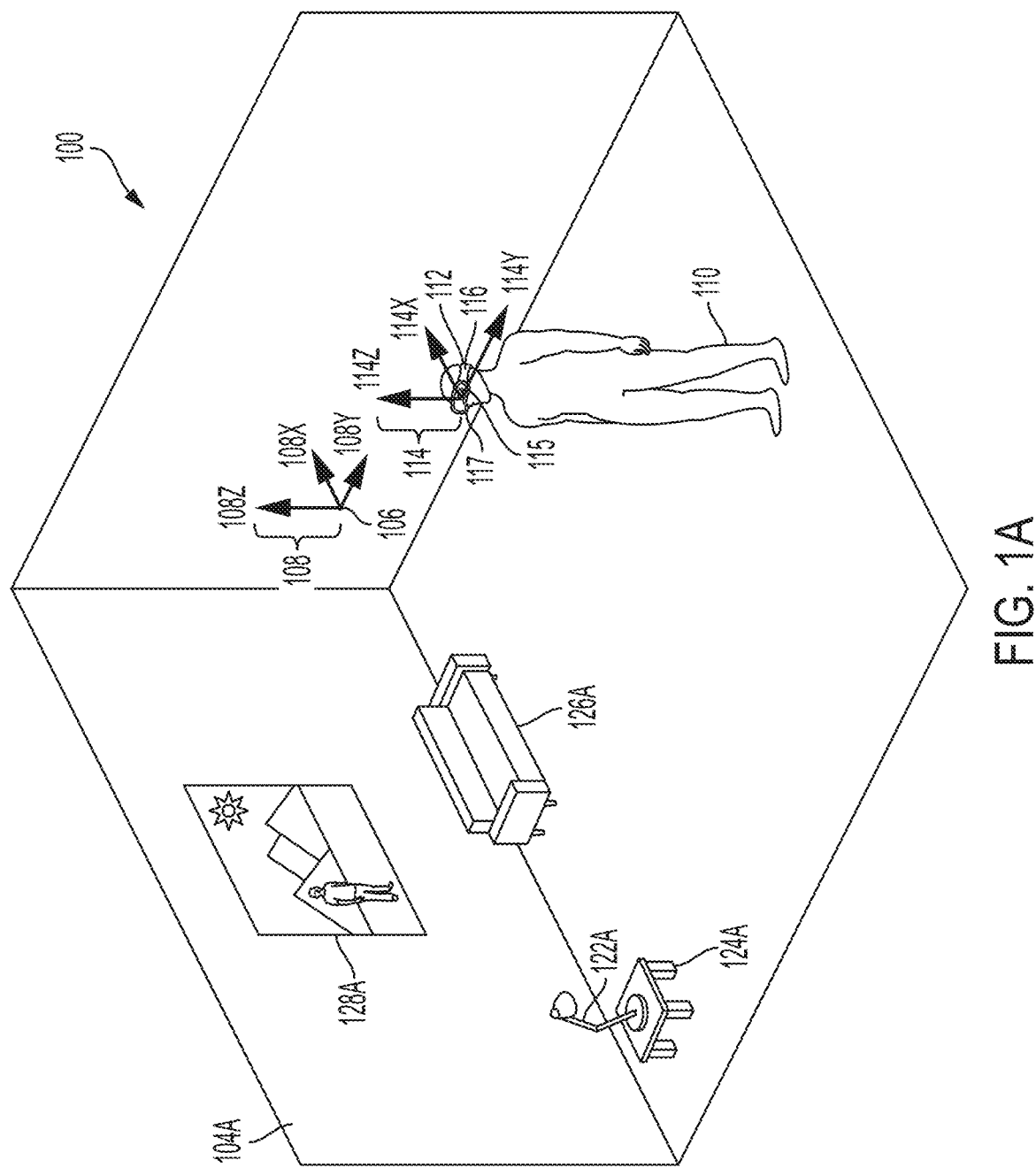
FIGS. 1A-1C illustrate exemplary mixed reality environments, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects;

people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted herein, a user may not directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an exemplary real environment 100 in which a user 110 uses a mixed reality system 112. Mixed reality system 112 may comprise a display (e.g., a transmissive display) and one or more speakers, and one or more sensors (e.g., a camera), for example as described herein. The real environment 100 shown comprises a rectangular room 104A, in which user 110 is standing; and real objects 122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
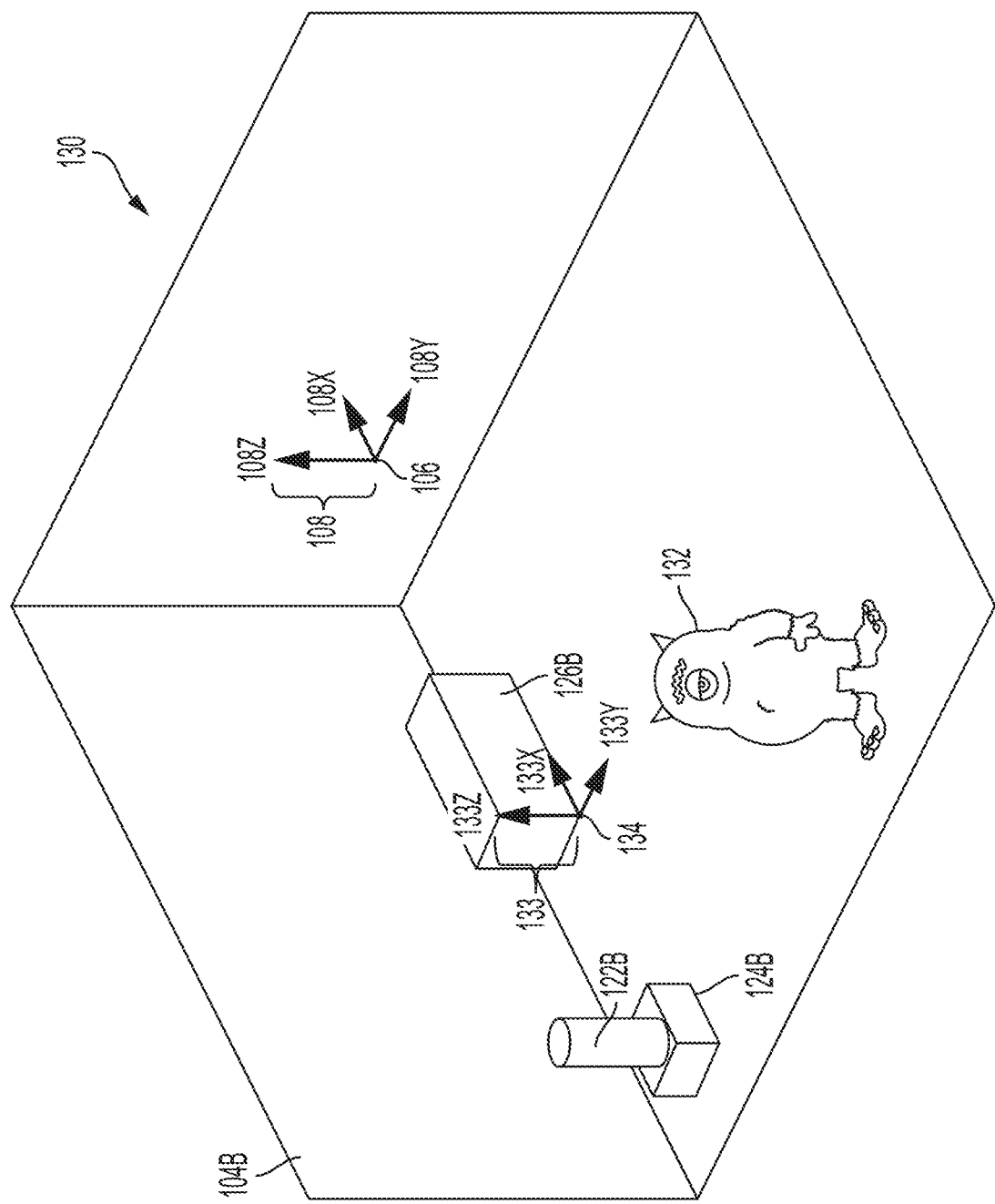

FIG. 1B illustrates an exemplary virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
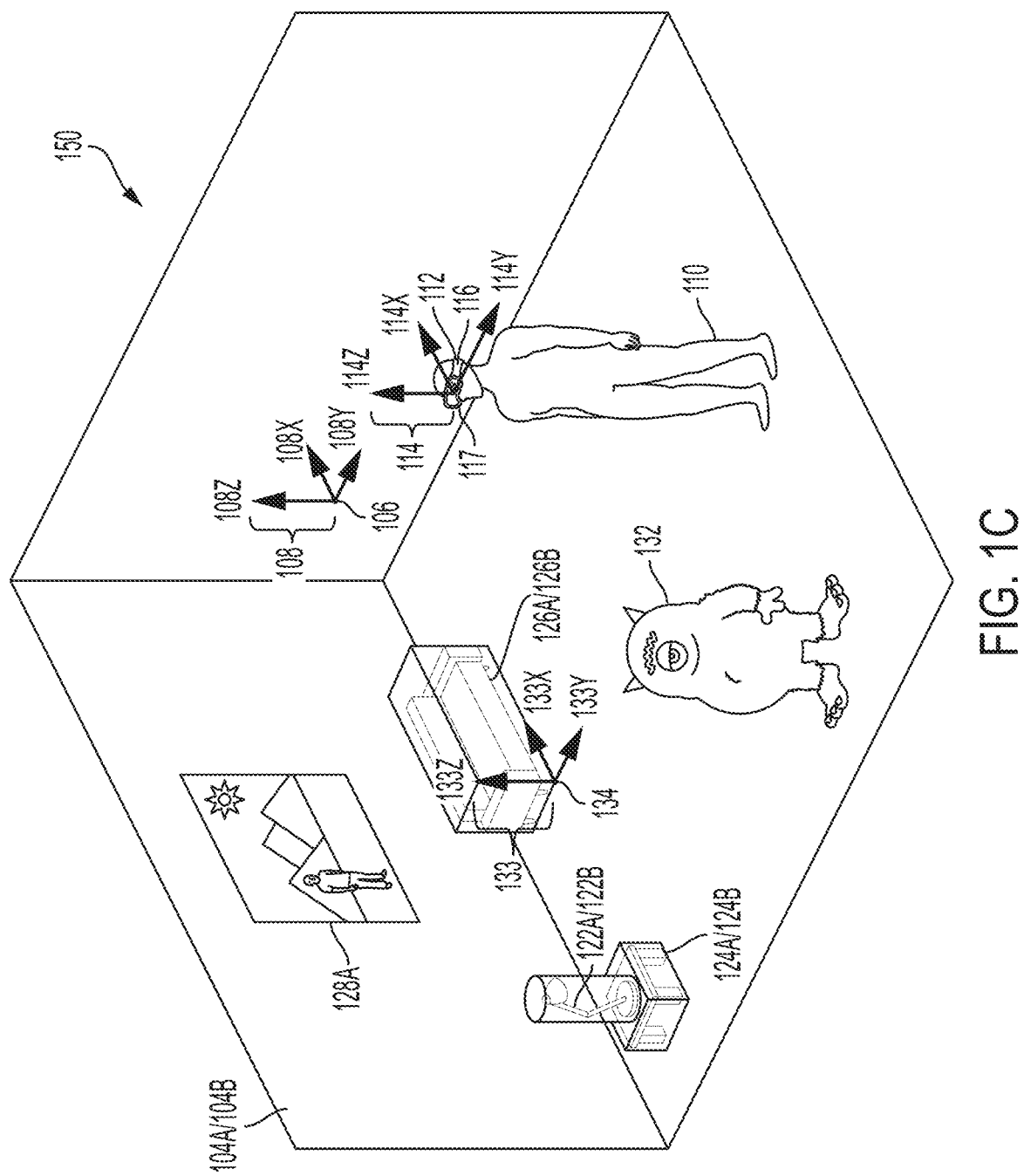

FIG. 1C illustrates an exemplary MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As described herein, origin point 106 may act as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described herein may also incorporate audio aspects. For instance, in MRE 150, virtual monster 132 could be associated with one or more audio signals, such as a footstep sound effect that is generated as the monster walks around MRE 150. As described herein, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Exemplary Mixed Reality System

Exemplary mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further herein.

Figure 2A:
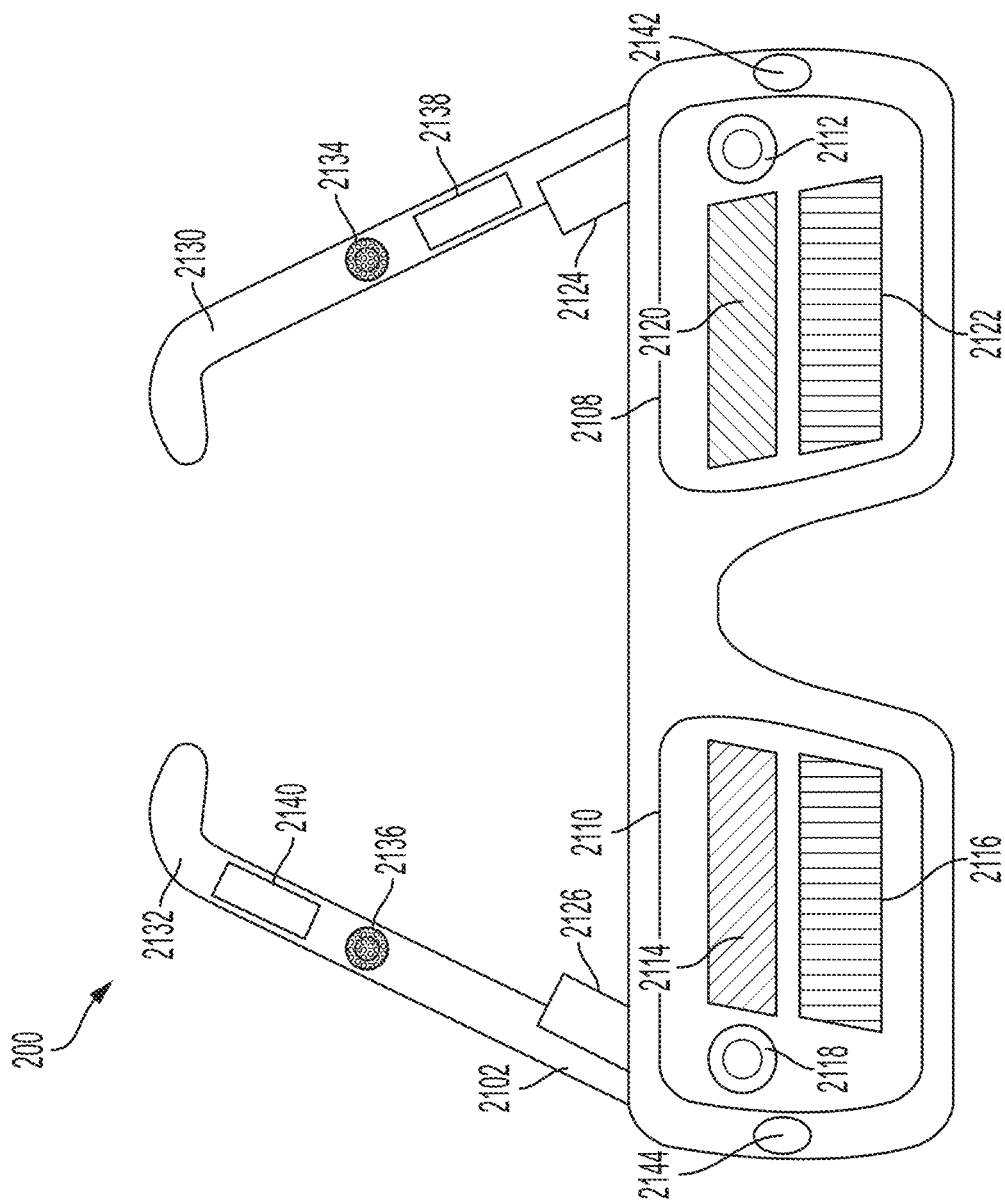
FIGS. 2A-2D illustrate components of exemplary mixed reality systems, according to one or more embodiments of the disclosure.
Figure 2B:
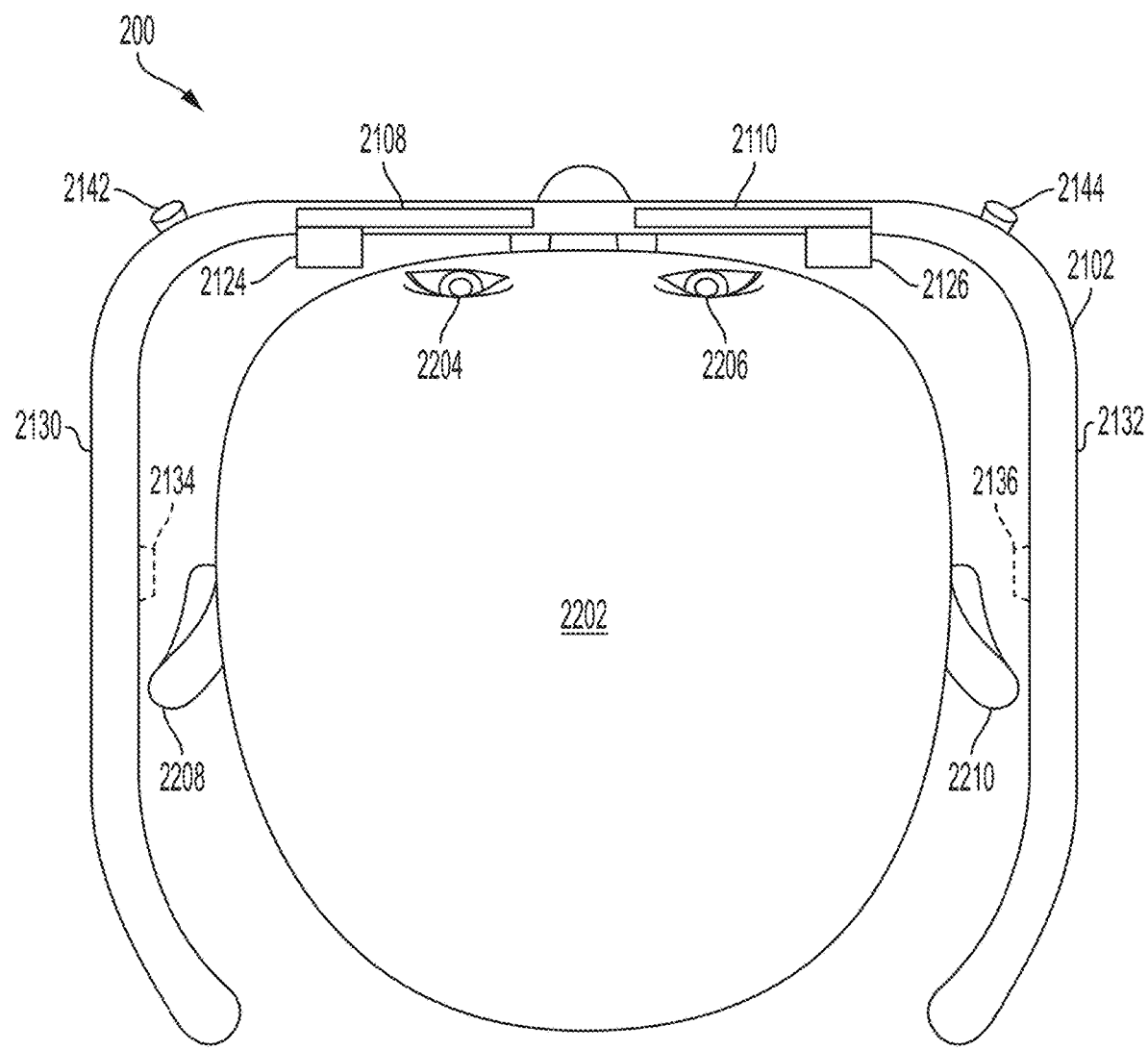
Figure 2C:
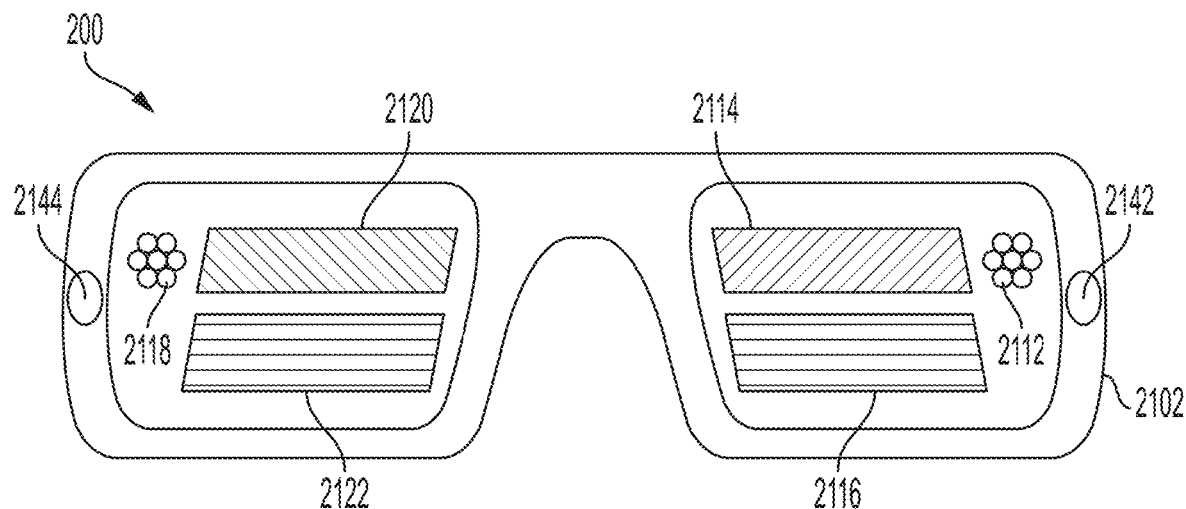
Figure 2D:
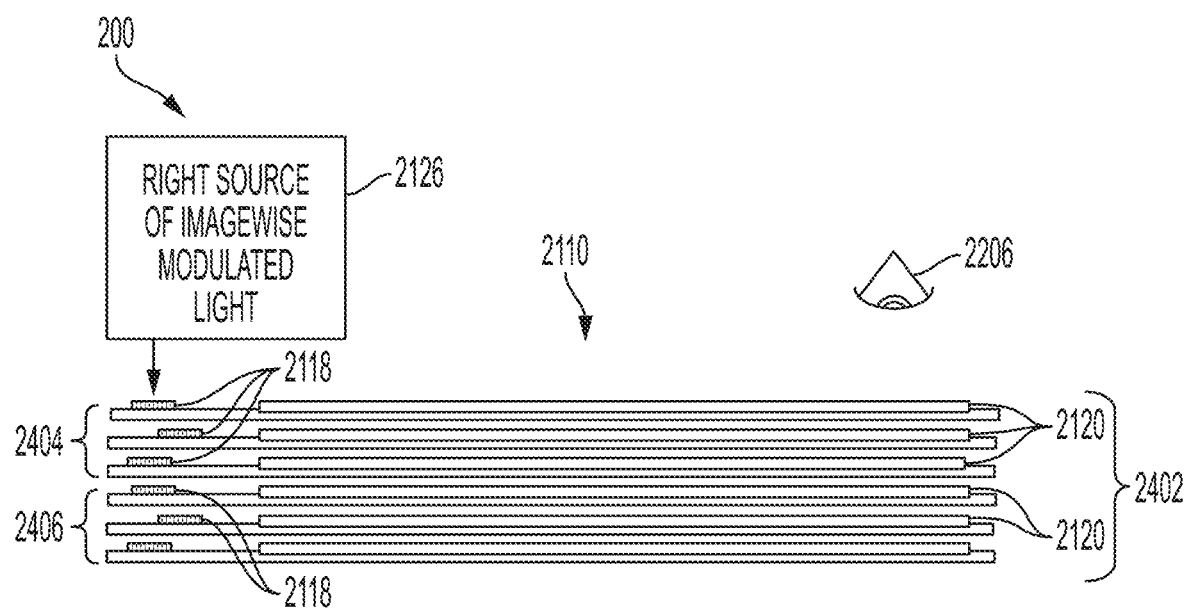

FIGS. 2A-2D illustrate components of an exemplary mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an exemplary left eyepiece (e.g., a left transparent waveguide set eyepiece) 2108 and an exemplary right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
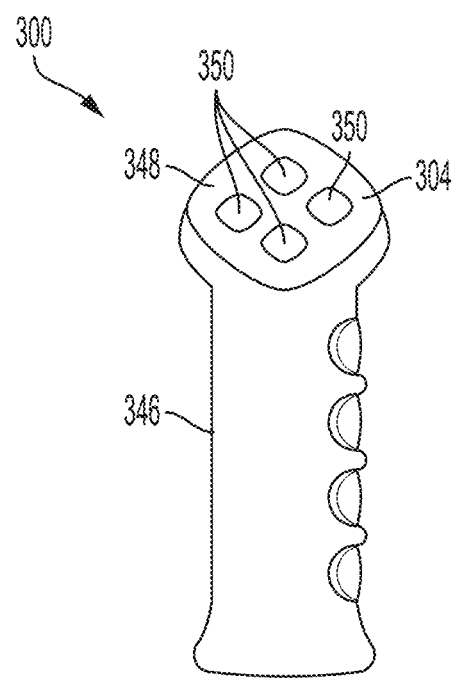
FIG. 3A illustrates an exemplary mixed reality handheld controller, according to one or more embodiments of the disclosure.

FIG. 3A illustrates an exemplary handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
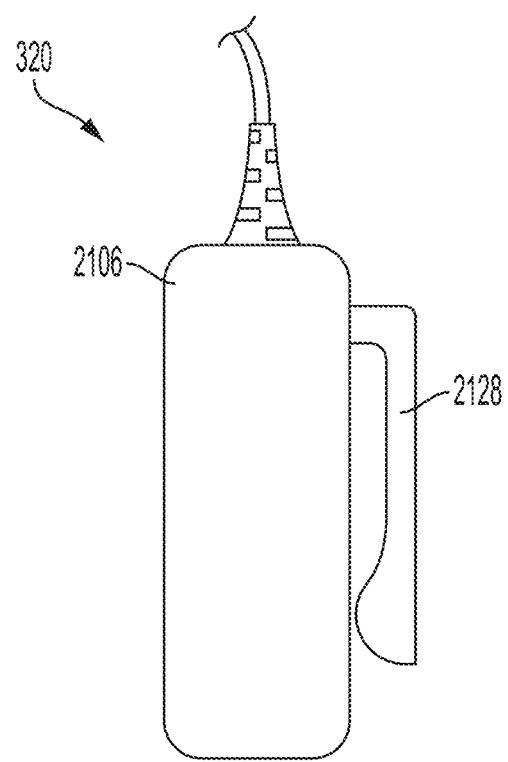
FIG. 3B illustrates an exemplary auxiliary unit, according to one or more embodiments of the disclosure.

FIG. 3B illustrates an exemplary auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
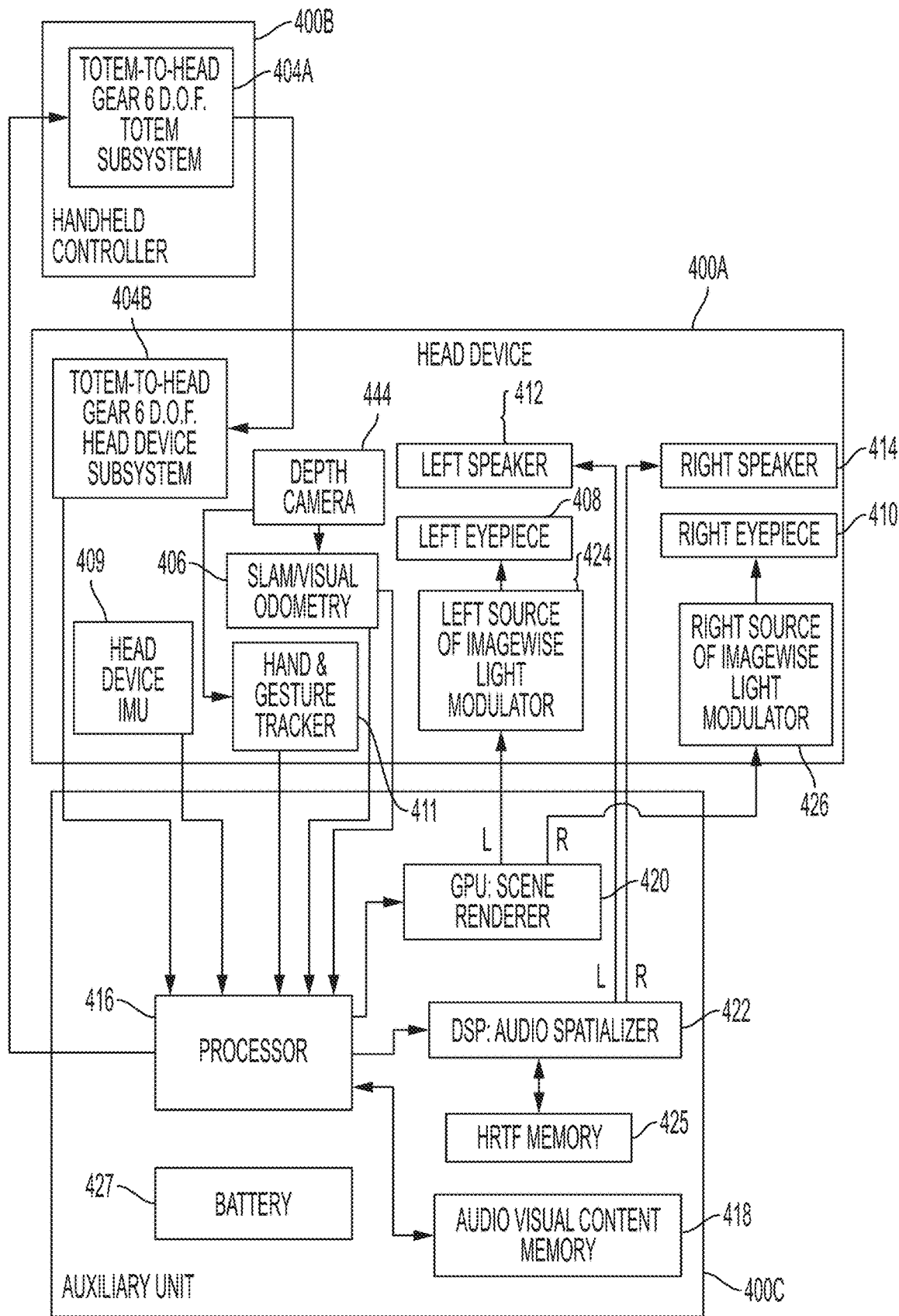
FIG. 4 illustrates an exemplary functional block diagram for an example mixed reality system, according to one or more embodiments of the disclosure.

FIG. 4 shows an exemplary functional block diagram that may correspond to an exemplary mixed reality system, such as mixed reality system 200 described herein (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described herein, or dedicated optical targets included in the handheld controller 400B) can be used for 6DOF tracking. In some examples, the handheld controller 400B can include a camera, as described herein; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals.

By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described herein with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described herein). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an exemplary mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Simultaneous Localization and Mapping

Displaying virtual content in a mixed reality environment such that the virtual content corresponds to real content can be challenging. For example, it can be desirable to display a virtual object 122B in FIG. 1C in the same location as real object 122A. To do so can involve a number of capabilities of mixed reality system 112. For example, mixed reality system 112 may create a three-dimensional map of real environment 104A and real objects (e.g., lamp 122A) within real environment 104A. Mixed reality system 112 may also establish its location within real environment 104A (which can correspond to a user's location within the real environment). Mixed reality system 112 may further establish its orientation within real environment 104A (which can correspond to a user's orientation within the real environment). Mixed reality system 112 may also establish its movement relative to real environment 104A, for example, linear and/or angular velocity and linear and/or angular acceleration (which can correspond to a user's movement relative to the real environment). SLAM can be one method to display a virtual object 122B in the same location as real object 122A even as a user 110 moves around room 104A, looks away from real object 122A, and looks back at real object 122A.

It can be further desirable to run SLAM in an accurate, but computationally efficient and low-latency manner. As used herein, latency can refer to the time delay between a change in a position or orientation of a component of a mixed reality system (e.g., a rotation of a wearable head device), and the reflection of that change as represented in the mixed reality system (e.g., a display angle of a field of view presented in a display of the wearable head device). Computational inefficiency and/or high latency can negatively impact a user's experience with mixed reality system 112. For example, if a user 110 looks around room 104A, virtual objects may appear to "jitter" as a result of the user's motion and/or high latency. Accuracy can be critical to produce an immersive mixed reality environment, otherwise virtual content that conflicts with real content may remind a user of the distinction between virtual and real content and diminish the immersion of the user. Further, in some cases, latency can result in motion sickness, headaches, or other negative physical experiences for some users. Computational inefficiency can produce exacerbated problems in embodiments where mixed reality system 112 is a mobile system that depends on a limited power source (e.g., a battery). Systems and methods described herein can produce an improved user experience as a result of more accurate, computationally efficient, and/or lower latency SLAM.

Visual-Inertial Odometry

Figure 5:
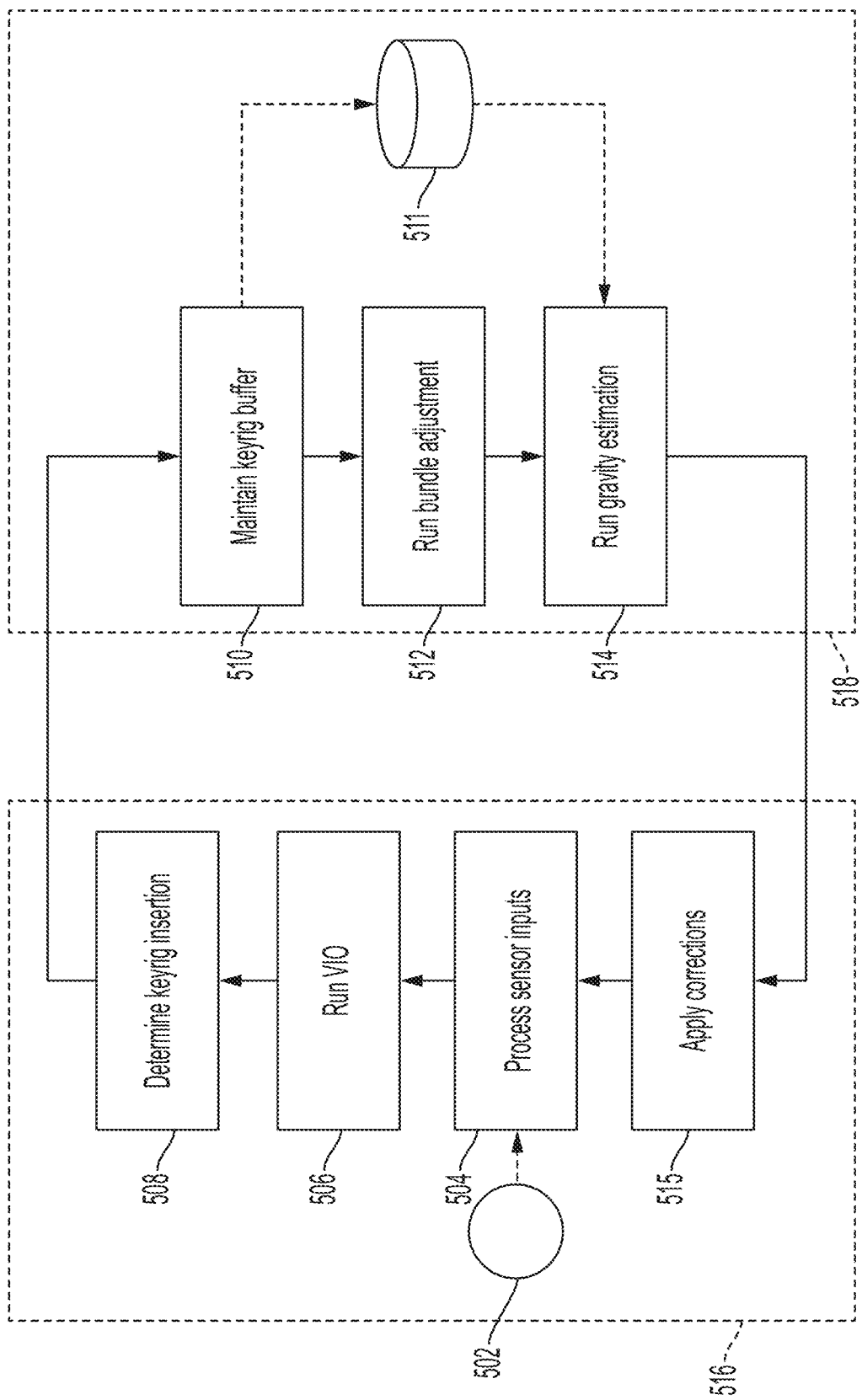
FIG. 5 illustrates an exemplary pipeline for visual-inertial odometry, according to one or more embodiments of the disclosure.

FIG. 5 illustrates an exemplary pipeline for visual-inertial odometry ("VIO") using bundle adjustments and a stand-alone gravity estimation. At step 504, sensor inputs from one or more sensors 502 can be processed. In some embodiments, sensor 502 can be an IMU, and processing IMU input at step 504 can include pre-integrating the IMU measurement. Pre-integrating IMU measurements can include determining a single relative motion constraint from a series of inertial measurements obtained from the IMU. It may be desirable to pre-integrate IMU measurements to reduce the computational complexity of integrating the entire series of inertial measurements. For example, inertial measurements collected between sequential frames (which can also be keyframes) captured in a video recording may include data about the entire path taken by the IMU. Keyframes can be specially selected frames based on time (e.g., time since previous keyframe selection), identified features (e.g., having sufficient new identified features when compared to previous keyframe), or other criteria. However, in some embodiments, VIO methods may only need data about the starting point (e.g., at the first frame) and the ending point (e.g., at the second frame). In some embodiments, VIO methods may only need data about a current point in time (e.g., the most recent frame) and a previous state (e.g., the previous frame). VIO computations may be simplified by pre-integrating inertial measurement data to produce a single relative motion constraint (e.g., from the first frame to the second frame). Pre-integrated inertial measurements may further be combined with other pre-integrated inertial measurements without needing to repeat the preintegration across both sets of measurements. This can be useful, for example, when inertial measurements between keyframes are pre-integrated, but it is later determined that a keyframe should no longer be used (e.g., because it was deleted as redundant or obsolete, or if the optimization is first performed on a first subset of keyframes and then performed on a different set of keyframes while reusing the results of the first optimization). For example, if inertial measurements between frame 1 and frame 2 have already been pre-integrated, and inertial measurements between frame 2 and frame 3 have already been pre-integrated, both sets of pre-integrated measurements can be combined without performing a new preintegration if frame 2 is removed from the optimization. It is also contemplated that this can be performed across any number of frames.

In some embodiments, step 504 can include tracking identified features in camera frames, where camera frames can be sensor inputs from sensor 502. For example, each image can be fed through a computer vision algorithm to identify features within the image (e.g., corners and edges). Adjacent or near-adjacent frames can be compared with each other to determine a correspondence between features across frames (e.g., one particular corner can be identified in two adjacent frames). In some embodiments, adjacency can refer to temporal adjacency (e.g., consecutively captured frames) and/or spatial adjacency (e.g., frames that capture similar features that may not have been captured consecutively). In some embodiments, a corresponding feature can be searched for within a given radius of an identified feature. The search radius can be fixed or a function of a velocity between the frames (e.g., calculated by integrating linear acceleration measured by the IMU).

At step 506, VIO computations can be run. VIO can be a method to observe, track, and locate features in an environment for use in SLAM. VIO can include information streams from multiple types of sensors. For example, VIO can include information streams from visual sensors (e.g., one or more cameras) and inertial sensors (e.g., an IMU). In one example method of VIO, a camera mounted on a moving mixed reality system (e.g., mixed reality system 112, 200) can record/capture multiple images (e.g., frames in a video recording). Each image can be fed through a computer vision algorithm to identify features within the image (e.g., corners and edges). Adjacent or near-adjacent frames can be compared with each other to determine a correspondence between features across frames (e.g., one particular corner can be identified in two sequential frames). In some embodiments, a three-dimensional map can be constructed (e.g., from stereoscopic images), and identified features can be located in the three-dimensional map.

In some embodiments, inertial information from an IMU sensor can be coupled with visual information from one or more cameras to verify and/or predict an expected position of an identified feature across frames. For example, IMU data gathered between two captured frames can include linear acceleration and/or angular velocity. In embodiments where the IMU is coupled to one or more cameras (e.g., both are embedded in a wearable head device), IMU data can determine movements for the one or more cameras. This information can be used to estimate where in a captured image an identified feature may be seen based on its estimated location in a three-dimensional map and based on the movement of the one or more cameras. In some embodiments, the newly estimated position of an identified feature in a three-dimensional map can be projected onto a two-dimensional image to replicate how one or more cameras may capture the identified feature. This projection of an estimated location of an identified feature can then be compared with a different image (e.g., a subsequent frame). The difference between a projection of an estimated location and an observed location can be a reprojection error for an identified feature.

An IMU can also contribute errors to a VIO optimization. For example, sensor noise can contribute to errors in IMU data. IMU sensor outputs can also include bias (e.g., an offset in recorded measurements that may be present even with no movement), which can be a function of physical properties of an IMU (e.g., temperature or mechanical stress). In some embodiments, errors in IMU data can accumulate as a result of integrating IMU data over time. A reprojection error can also be a function of an inaccurate estimate of an identified feature's location in a three-dimensional map. For example, if an originally assumed position of an identified feature is incorrect, a newly estimated position for that feature after movement can also be incorrect, and consequently a projection of the newly estimated position onto a two-dimensional image can also be incorrect. It can be desirable for a VIO optimization to minimize overall errors, which can include reprojection errors and IMU errors.

Figure 6A:
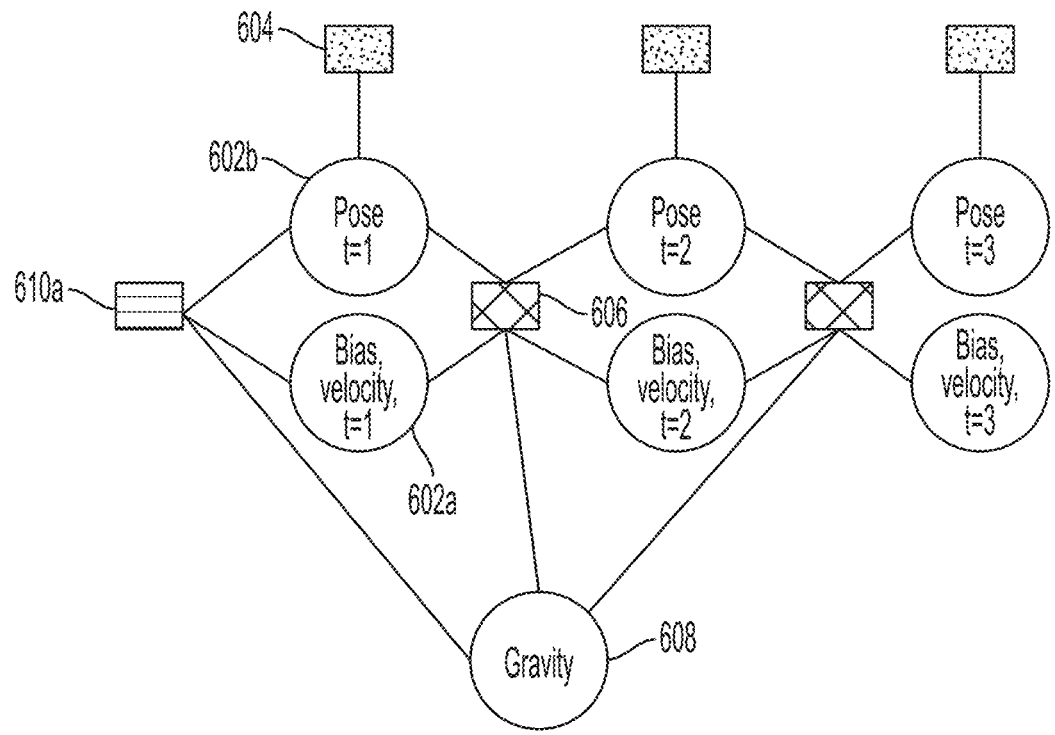
FIGS. 6A-6B illustrate exemplary graphs for visual-inertial odometry, according to one or more embodiments of the disclosure.
Figure 6B:
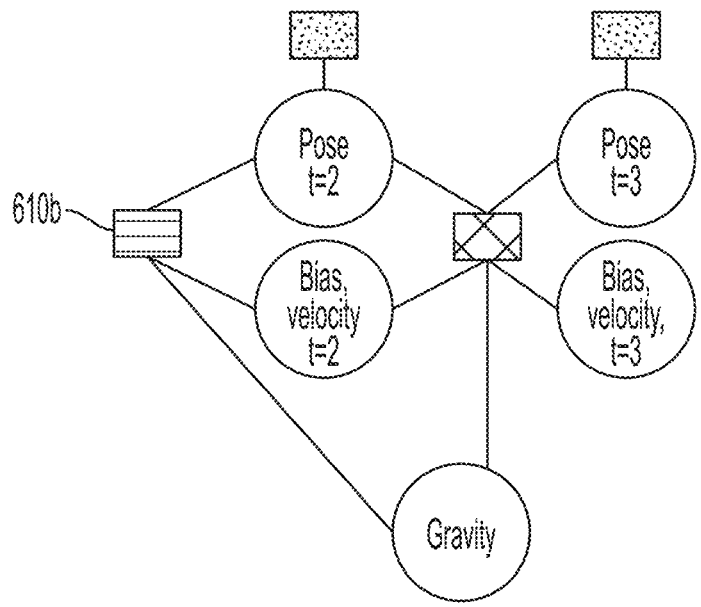

FIGS. 6A-6B illustrate example graphs of a VIO computation. The exemplary graphs can visually depict a non-linear factorization of a function of several variables. For example, variables (e.g., $602a$ and $602b$) can be represented as circular nodes, and functions of variables (e.g., $604$, $606$, and $610a$, also called factors) can be represented as square nodes. Each factor can be a function of any attached variables. In the depicted embodiment, nodes $602a$ and $602b$ can represent data associated with an image captured at t=1. Data associated with an image captured at t=2 and an image captured at t=3 are displayed in the example embodiment as well. Node $602a$ can represent variable information including bias (e.g., IMU bias) and velocity, which can be obtained by integrating acceleration measurements over time. Node $602a$ can represent a bias of an IMU and velocity of a camera affixed to an IMU at a time t=1 when the camera captured an image. Node $602b$ can represent a pose estimation at a time t=1. Pose estimation can include an estimate of a camera's position and orientation in three-dimensional space (which can be a result of VIO). Node $604$ can represent a perspective-n-points ("PnP") term at time t=1. A PnP term can include estimates of an identified feature's position and orientation in three-dimensional space (e.g., a corner of an object identified in an image). Node $606$ can include IMU measurements captured between time t=1 and time t=2. IMU measurements at node $606$ can optionally be pre-integrated to reduce computational load. Node $608$ can represent a gravity estimate for a real environment. A gravity estimate can include an indication of an estimated direction of gravity (e.g., a vector) based on inertial measurements from an IMU.

Nodes $610a$ and $610b$ can include a marginalization prior. In some embodiments, a marginalization prior can include marginalized information about some or all previously captured frames. In some embodiments, a marginalization prior can contain estimates of some or all previous camera states (which can include pose data), gravity estimates, and/or IMU extrinsics. In some embodiments, a marginalization prior can include an information matrix that can capture dependencies of the state to previous visual and/or inertial measurements. In some embodiments, a marginalization prior can include one or more error vectors holding residual errors at a linearization point. It can be beneficial to use a marginalization prior for several reasons. One advantage can be that a marginalization term can allow an optimization problem to have a fixed number of variables even if the optimization has no predetermined limits. For example, VIO may be run on any number of frames, depending on how long a user may use a mixed reality system running VIO. A VIO optimization may therefore require optimizing many thousands of frames, which can exceed computational limits of a portable system. A marginalization prior can provide information about some or all previous frames in a single term, such that an optimization problem can compute with far fewer variables (e.g., three variables: a marginalization prior and the two most recent frames). Another advantage can be that a marginalization prior can take into account a long history of previous frames. For example, computing limits may demand that only recent frames (e.g., the three most recent frames) can be optimized. As a result, the optimization can suffer from drift, where an error introduced in one frame can continue to be propagated forward. A marginalization prior that approximates information of many previous frames can be less susceptible to errors introduced by single frames. In some embodiments, marginalization prior $610a$ can approximate information from all frames captured prior to a time t=1.

FIG. 6B illustrates an exemplary embodiment where a frame captured at t=1 and data associated with the frame captured at t=1 is marginalized into marginalization prior node $610b$, which can include data about marginalization prior $610a$ and data about the newly marginalized frame captured at t=1. In some embodiments, VIO can utilize a sliding window size, for example of two frames, in addition to a marginalization prior that marginalizes previous frames. As a new frame is added to the VIO optimization (which can minimize error), the oldest frame can be marginalized into the marginalization prior term. A sliding window of any size can be used; larger window sizes can produce a more accurate VIO estimation, and smaller window sizes can produce a more efficient VIO calculation. In some embodiments, a VIO optimization can fix nodes representing PnP terms (e.g., node $604$), and optimize only nodes representing pose (or state) estimates, gravity estimates, inertial measurements, and/or IMU extrinsics (which can be included in node $602a$). A state estimate can include a pose estimate in addition to a velocity estimate and a bias estimate.

In some embodiments, each frame factored into a VIO estimate of state can have an associated weight. For example, minimizing error can result in frames with many identified features being weighted more heavily in the optimization. Because errors can originate from visual information (e.g., reprojection errors) and/or inertial information (e.g., IMU bias), a frame with a large number of identified features may be weighted too heavily, thereby diminishing the relative weight of inertial measurements during the minimization process. It can be desirable to dampen the scaling of a frame's weight with identified features because such scaling can reduce the weight of IMU data by comparison, and because the scaling can assign too much weight to one frame relative to other frames. One solution to dampen the weight scaling is to divide the weight of each identified feature by the square root of the sum of all weights of all identified features in a frame. Each dampened reprojection error can then be minimized in the VIO optimization, thereby dampening the scaling of visual information with more identified features.

In some embodiments, each identified feature can have a weight associated with a confidence in the identified feature. For example, a reprojection error between an identified feature and its expected location based on an observation of a corresponding feature in a previous frame and an estimated motion between the frames can be weighted (e.g., larger reprojection errors can be assigned a lower weight). In another example, a reprojection error can be removed from calculations as an outlier based on a distribution of measured reprojection errors in an image. For example, the highest 10% of reprojection errors can be eliminated from calculations as outliers, although any threshold can be used, including dynamic thresholds.

In some embodiments, it can be desirable to modify how a marginalization prior is updated if a mixed reality system (e.g., mixed reality system 112, 200) is static and unmoving. For example, if a mixed reality system is set on a table but continues running, it can continue to observe features and inertial measurements, which can lead to overconfidence in a state estimation due to the repeated measurements. It can therefore be desirable to stop updating an information matrix (which can include uncertainties) in a marginalization prior if it is detected that a mixed reality system has been static for a threshold amount of time. A static position can be determined from IMU measurements (e.g., recording no significant measurements outside the noise range), from visual information (e.g., frames continue to show no movement in identified features), or other suitable methods. In some embodiments, other components of a marginalization prior (e.g., error vector, estimation of state) can continue to be updated.

Bundle Adjustment and Gravity Estimation

Referring back to FIG. 5, keyrig insertion can be determined at step 508. It can be beneficial to use keyrigs for gravity estimation, bundle adjustment, and/or VIO because the use of keyrigs can lead to sparser data over longer timeframes without increasing computational load. In some embodiments, a keyrig can be a set of keyframes from a multi-camera system (e.g., a MR system with two or more cameras), which may have been captured at a certain time. In some embodiments, a keyrig can be a keyframe. Keyrigs can be selected based on any criteria. For example, keyrigs can be selected in the time-domain based on elapsed time between keyrigs (e.g., one frame every half-second can be selected as a keyrig). In another example, keyrigs can be selected in the spatial-domain based on identified features (e.g., a frame can be selected as a keyrig if it has sufficiently similar or different features as compared to the previous keyrig). Keyrigs can be stored and saved to memory.

In some embodiments, dense keyrig insertion (which can be useful for a gravity estimate) can be performed (e.g., if standard keyrig insertion provides data that is too sparse). In some embodiments, threshold conditions can be met before dense keyrig insertion is performed. One threshold condition can be if the VIO optimization is still accepting a gravity input. Another threshold condition can be if a threshold amount of time (e.g., 0.5 seconds) has passed since the last keyrig was inserted. For example, inertial measurements may only be valid over short lengths of time as a result of IMU errors (e.g., bias or drift), so it may be desirable to limit the amount of time between keyrigs when inertial measurements are collected (and optionally pre-integrated). Another threshold condition can be whether there is sufficient motion between the most recent keyrig candidate and the most recent keyrig (i.e., it can be desirable to have sufficient motion to make all variables observable). Another threshold condition can be if the newest keyrig candidate is sufficiently high quality (e.g., if the new keyrig candidate has a sufficiently high ratio of reprojection inliers to reprojection outliers). Some or all of these threshold conditions may be required before a dense keyrig insertion, and other threshold conditions may be used as well.

At step 510, a keyrig buffer can be maintained. A keyrig buffer can include memory configured to store inserted keyrigs. In some embodiments, keyrigs can be stored with associated inertial measurement data (e.g., raw inertial measurements or pre-integrated inertial measurements) and/or associated timestamps (e.g., of when the keyrig was captured). It can also be determined whether a time gap between keyrigs is sufficiently short to maintain a validity for pre-integrating inertial measurements. If it is determined that the time gap is not sufficiently short, the buffer can be reset to avoid a poor estimation (e.g., a poor gravity estimation). Keyrigs and associated data can be stored in database 511.

At step 512, a bundle adjustment can be performed. A bundle adjustment can optimize the estimates of camera poses, states, feature positions, and/or other variables based on repeated observations of identified features across frames to increase an accuracy of and confidence in the estimates (e.g., of the positions of the identified features). Although the same identified feature may be observed multiple times, each observation may not be consistent with other observations as a result of errors (e.g., IMU biases, feature detection inaccuracy, camera calibration error, computational simplifications, etc.). It can therefore be desirable to estimate a likely position of an identified feature in a three-dimensional map using multiple observation of the identified feature while minimizing the error of input observations. Bundle adjustment can include optimizing frames (or keyrigs) over a sliding window (e.g., of thirty keyrigs). This can be referred to as fixed-lag smoothening, and can be more accurate than using Kalman filters, which may accumulate past errors. In some embodiments, a bundle adjustment can be a visual-inertial bundle adjustment, wherein the bundle adjustment is based on visual data (e.g., images from a camera) and inertial data (e.g., measurements from an IMU). A bundle adjustment can output a three-dimensional map of identified features that can be more accurate than a three-dimensional map generated by VIO. A bundle adjustment can be more accurate than a VIO estimation because a VIO estimation may be performed on a per-frame basis, and a bundle adjustment may be performed on a per-keyrig basis. In some embodiments, a bundle adjustment can optimize map points (e.g., identified features) in addition to a position and/or orientation of a MR system (which may approximate a position and/or orientation of a user). In some embodiments, a VIO estimation may optimize only a position and/or orientation of a MR system (e.g., because the VIO estimation may take map points as fixed inputs). Utilizing keyrigs can allow input data to span a longer timeframe without increasing the computational load, which can result in an increase in accuracy. In some embodiments, bundle adjustment may be performed remotely on a more powerful processor, allowing a more accurate estimation (due to more optimized frames) than compared to VIO.

In some embodiments, a bundle adjustment can include minimizing errors, which can include visual errors (e.g., reprojection errors) and/or inertial errors (e.g., errors resulting from an estimate of an identified feature's position based on a previous keyrig and movement to the next keyrig). Minimizing errors can be done by identifying a root mean square of errors, and optimizing estimates to achieve the lowest average root mean square of all errors. It is also contemplated that other minimization methods may be used. In some embodiments, individual measurements can be assigned individual weights (e.g., measurements can be weighted based on a confidence in the accuracy of the measurement). For example, measurements from images captured from more than one camera can be weighted according to a quality of each camera (e.g., a higher quality camera can produce measurements with more weight). In another example, measurements can be weighted according to a temperature of a sensor at a time the measurement was recorded (e.g., a sensor may perform optimally within a specified temperature range, so measurements taken within that temperature range may be weighted more heavily). In some embodiments, depth sensors (e.g., LIDAR, time of flight cameras, etc.) can provide information in addition to visual and inertial measurements. Depth information can also be included in bundle adjustment by also minimizing errors associated with depth information (e.g., when depth information is compared to an estimated three-dimensional map built from visual and inertial information). In some embodiments, a global bundle adjustment can be performed, using bundle adjustment outputs as inputs (instead of, for example, keyrigs) to further improve accuracy.

Figure 7A:
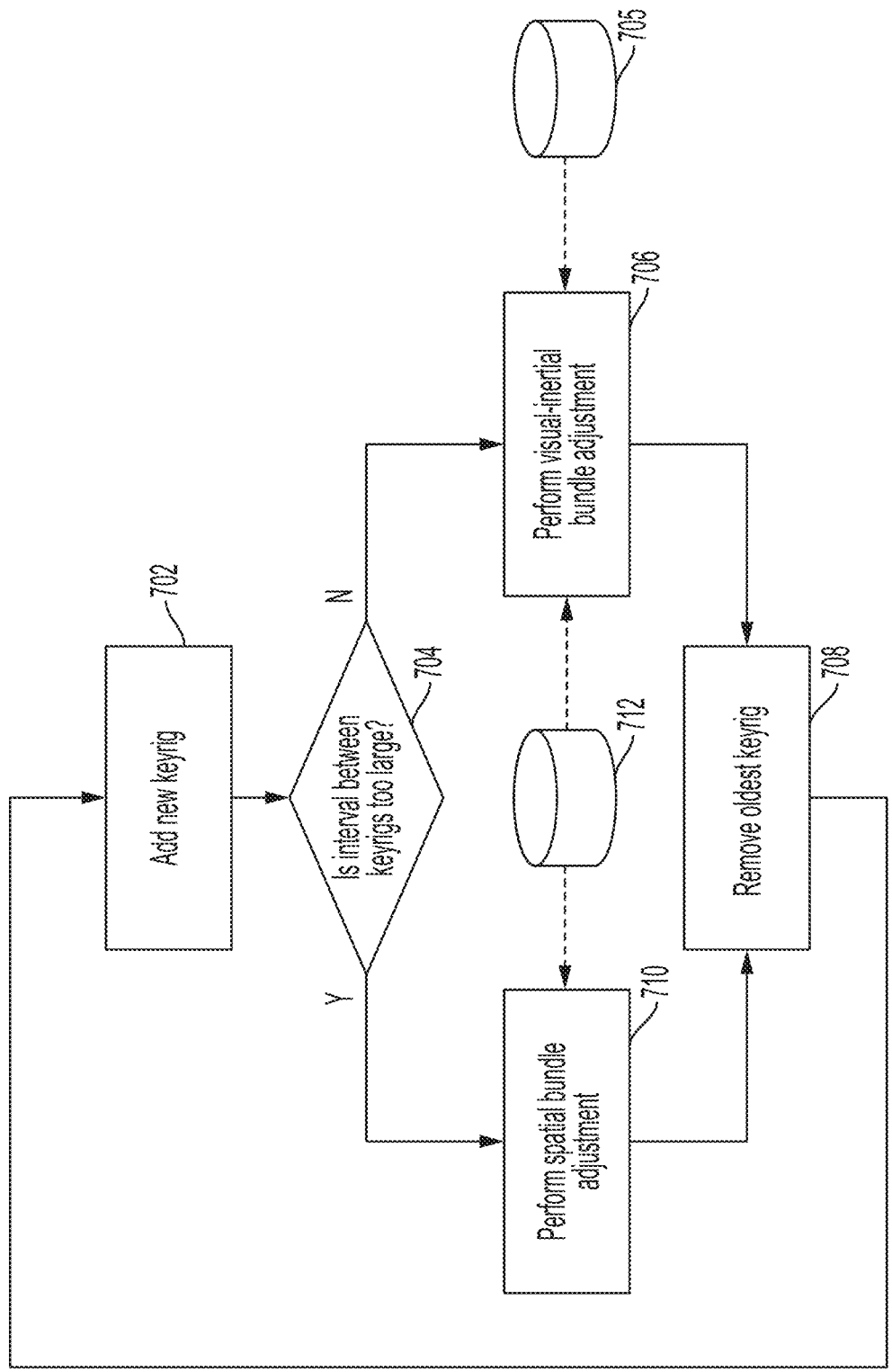
FIGS. 7A-7B illustrate exemplary decision processes for performing bundle adjustments, according to one or more embodiments of the disclosure.

FIG. 7A illustrates an exemplary decision process for performing bundle adjustment. At step 702, a new keyrig can be added to the sliding window for optimization. At step 704, the time intervals between each keyrig in the sliding window can be evaluated. If none of the time intervals are above a certain static or dynamic time threshold (e.g., 0.5 seconds), a visual-inertial bundle adjustment can be performed at step 706 using inertial measurements from database 705 and keyrigs (which can be images) from database 712. Database 705 and database 712 can be the same database or separate databases. In some embodiments, if at least one time interval between sequential keyrigs is above a certain static or dynamic time threshold, a spatial bundle adjustment can be performed at step 710. It can be beneficial to exclude inertial measurements if a time interval is above a static or dynamic time threshold because IMU measurements may only be valid for integration over a short period of time (due to, for example, sensor noise and/or drift). A spatial bundle adjustment may optionally rely on a different set of keyrigs than a visual-inertial bundle adjustment. For example, the sliding window may change from being fixed to a certain time or a certain number of keyrigs to being fixed to the spatial domain (e.g., the sliding window is fixed to a certain amount of movement). At step 708, the oldest keyrig can be removed from the sliding window.

Figure 7B:
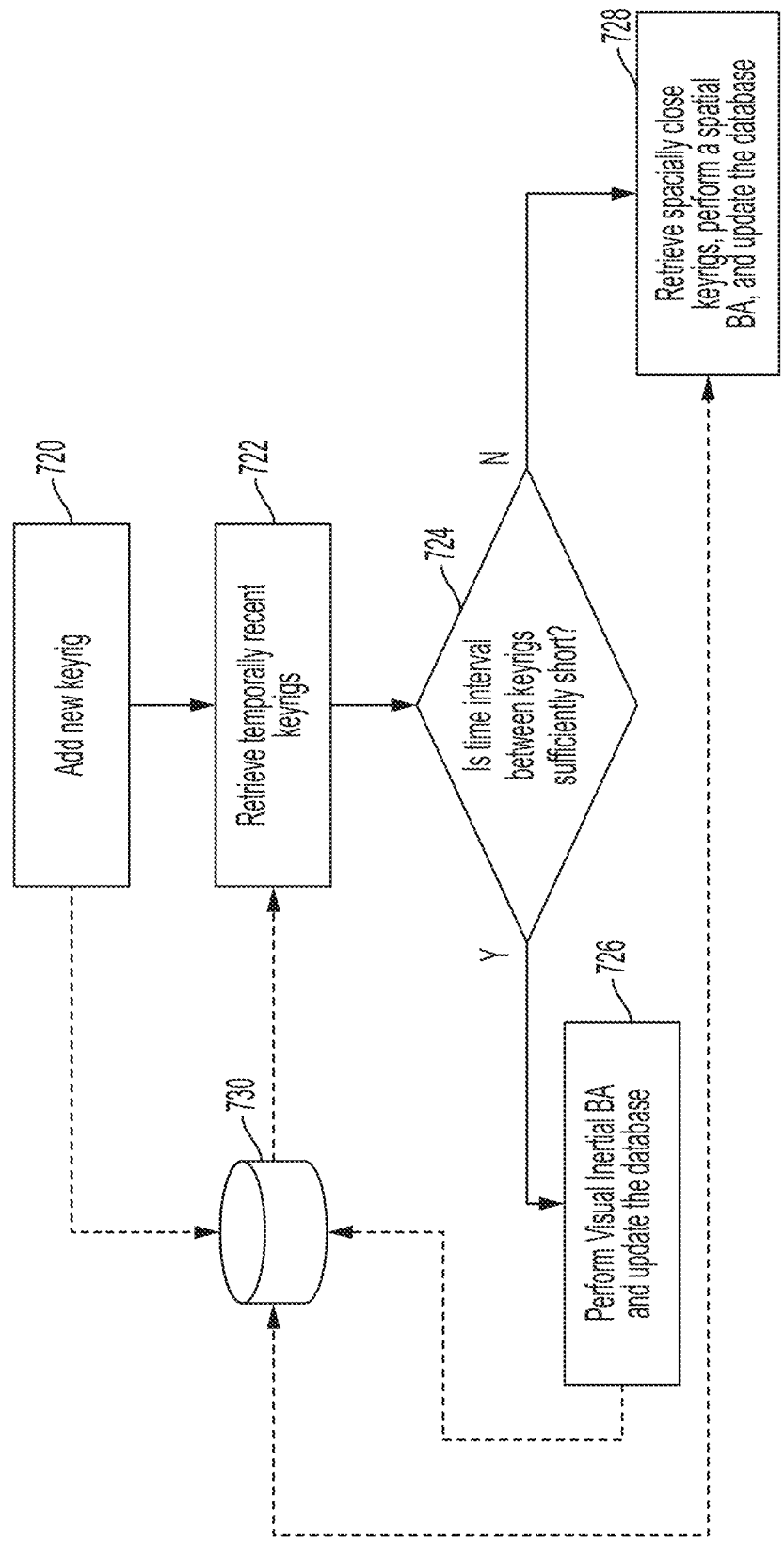

FIG. 7B illustrates an exemplary decision process for performing bundle adjustment. At step 720, a new keyrig can be added to the sliding window for optimization. At step 722, temporally recent keyrigs can be retrieved from a database of keyrigs 730. For example, a number (e.g., five) of the most recently captured keyrigs (e.g., based on associated timestamps) may be retrieved. At step 724, it can be determined if a time interval between each retrieved keyrig is below a static or dynamic threshold (e.g., 0.5 seconds). If each time interval between captured keyrigs is below a static or dynamic threshold, a visual-inertial bundle adjustment may be performed at step 726, which may utilize inertial measurements in addition to visual information from the keyrigs. If at least one time interval between captured keyrigs is above a static or dynamic threshold, at step 728 spatially close keyrigs may be retrieved from database 730. For example, keyrigs with a threshold number of identified features corresponding to identified features in the newest keyrig can be retrieved. At step 728, a spatial bundle adjustment may be performed, which may use visual information from keyrigs, and may not use inertial information for the bundle adjustment.

Other decision processes can also be used for performing bundle adjustment. For example, at step 704 and/or 724, it can be determined whether any time interval between sequential keyrigs exceeds a static or dynamic threshold of time. If at least one time interval is determined to exceed the threshold, inertial measurements can be ignored between the two relevant keyrigs, but can still be used for all remaining keyrigs that comply with the time interval threshold. In another example, if a time interval is determined to exceed the threshold, one or more additional keyrigs can be inserted between the two relevant keyrigs, and a visual-inertial bundle adjustment can be performed. In some embodiments, keyrigs in the keyrig buffer or stored in database 511 and/or 730 can be updated with the results of the bundle adjustment.

Referring back to FIG. 5, at step 514, a standalone gravity estimation can be performed. A standalone gravity estimation performed at step 514 can be more accurate than a VIO gravity estimation determined at step 506, for example, because it may be performed on a more powerful processor or over a longer timeframe, allowing for optimization over additional variables (e.g., frames or keyrigs). A standalone gravity estimation can utilize keyrigs (which can comprise keyframes) to estimate gravity (e.g., a vector), which can be used for SLAM and/or VIO. Keyrigs can be beneficial because they can allow for a standalone gravity estimation to be performed over a longer period of time without exceeding computational limits. For example, a standalone gravity estimation over 30 s may be more accurate than a standalone gravity estimation over 1 s, but a 30$s$ estimation may require optimizing 900 frames if a video was recorded at 30 fps. Keyrigs can be obtained at sparser intervals (e.g., twice per second) such that the gravity estimation may only require optimizing 60 frames. In some embodiments, keyrigs used for a standalone gravity estimation can be the result of a dense keyrig insertion (which may be performed at step 508). A gravity estimate can also utilize simple frames. It can be desirable to estimate a direction for gravity to anchor a display of virtual content that corresponds to real content. For example, a poor gravity estimate can lead to virtual content appearing tilted relative to the real content. Although an IMU can provide inertial measurements which can include gravity, the inertial measurements may also include all other motion (e.g., actual motion or noise), which may obscure the gravity vector.

Figure 8:
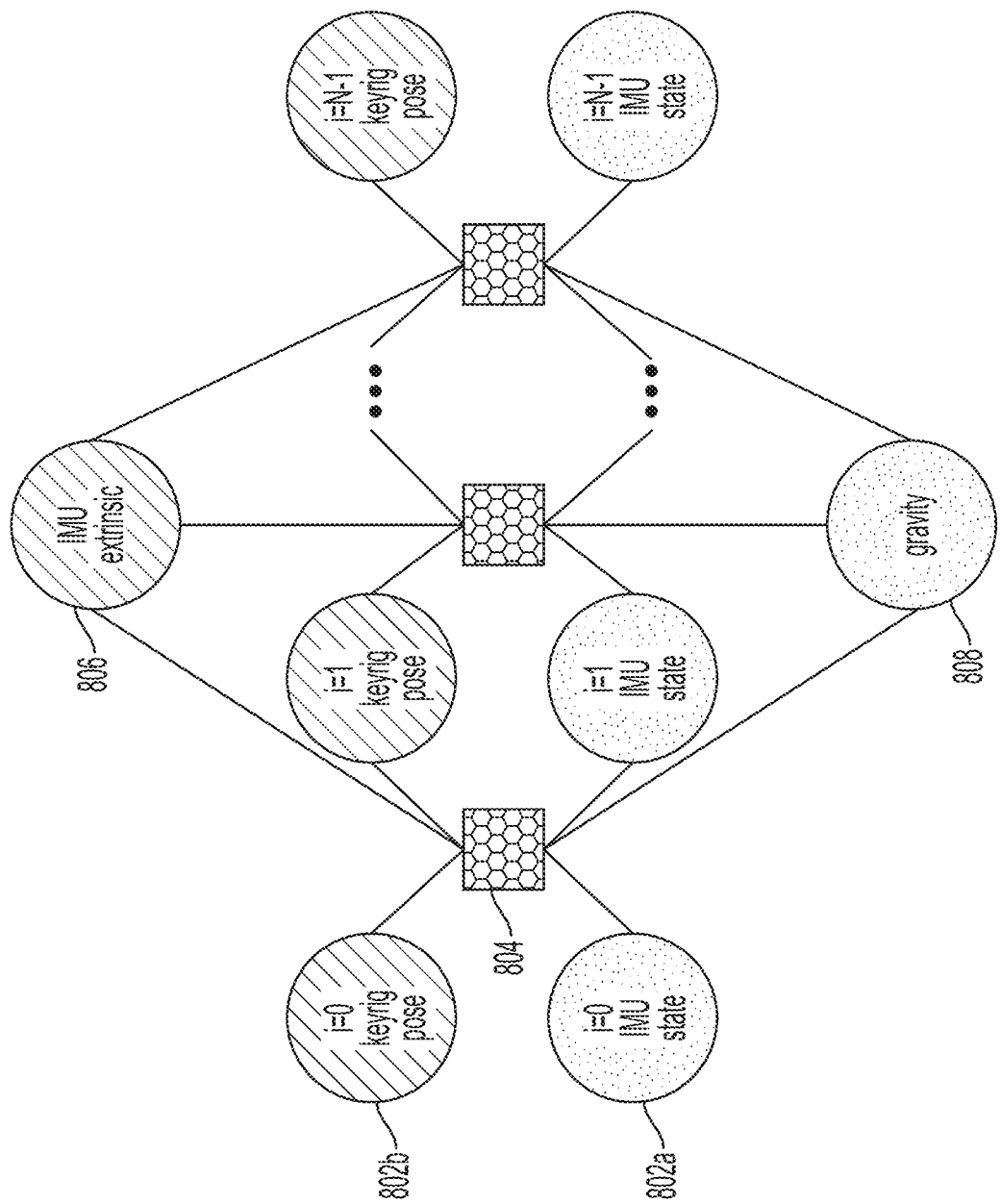
FIG. 8 illustrates an exemplary graph for a standalone gravity estimate, according to one or more embodiments of the disclosure.

FIG. 8 illustrates an exemplary graph of a standalone gravity estimation. The exemplary graph can visually depict a non-linear factorization of a function of several variables. For example, variables (e.g., 802$a$ and 802$b$) can be represented as circular nodes, and functions of variables (e.g., 804, also called factors) can be represented as square nodes. Each factor can be a function of any attached variables. Nodes 802$a$ and 802$b$ can represent data associated with a keyrig captured at time i=0. Node 802$a$ can include data representing an IMU state, which can be estimates of errors in the IMU measurements. The IMU state can be an output from a VIO method. Node 802$b$ can include data representing a keyrig pose associated with a particular keyrig. The keyrig pose can be based on the output of the bundle adjustment. Node 804 can include an IMU term edge, which can include pre-integrated inertial movements. Node 804 can also define an error function relating other attached nodes to each other. Node 806 can include data representing IMU extrinsics (which can correspond to a precision and orientation of the IMU with respect to a mixed reality system), and node 808 can include a gravity estimate. The gravity estimation optimization can include minimizing the error function at node 804. In some embodiments, nodes related to keyrig pose and IMU extrinsics (e.g., nodes 802$b$ and 806) can be fixed, and nodes related to IMU state and gravity (e.g., nodes 802$a$ and 808) can be optimized.

Referring back to FIG. 5, at step 515, results from the standalone gravity estimation and from the bundle adjustment can be applied to the VIO outputs. For example, the difference between the VIO gravity estimate and the standalone gravity estimate and/or the difference between the VIO pose estimate and the bundle adjustment pose estimate can be represented by a transformation matrix. The transformation matrix can be applied to the VIO pose estimation and/or the marginalization prior's pose estimation. In some embodiments, a rotational component of the transformation matrix can be applied to the state estimated by the VIO and/or the VIO's gravity estimate. In some embodiments, a standalone gravity estimation may not be applied to correct a VIO gravity estimate if a generated map has become too large (i.e., if the standalone gravity estimate has to be applied to too many frames, it may be computationally infeasible). In some embodiments, blocks in group 516 can be performed at a separate location than blocks in group 518. For example, group 516 can be performed at a wearable head device, which may include a power-efficient processor and a display. Group 518 can be performed at an attached device (e.g., a hip-wearable device) that can include a more powerful processor. It can be desirable to perform certain calculations (e.g., those in group 516) in approximately real-time so that a user can have low-latency visual feedback for the virtual content. It can also be desirable to perform more accurate and computationally expensive calculations in parallel and back-propagate corrections to maintain long-term accuracy of the virtual content.

Dual IMU Slam

In some embodiments, two or more IMUs can be used for SLAM calculations. The addition of a second IMU can improve accuracy of SLAM computations, which can result in less jitters and/or drift in virtual content. The addition of a second IMU in SLAM computations may also be advantageous in situations when information associated with map points may not be sufficient for a more accurate SLAM computation (e.g., low texture (e.g., a wall lacking geometrical or visual features, such as a flat wall in one color), low light, low light and low texture). In some examples, a reduction of 14-19% for drift and 10-20% for jitter may be achieved using two IMUs to compute SLAM, compared to using one IMU. Drift and jitter may be measured relative to an actual position (e.g., to an actual position of an object in a mixed reality environment) in arcminutes.

In some embodiments, the second IMU may be used in low light or low texture situations, and the second IMU may not be used in situations when lighting and/or texture of a mixed reality environment are sufficient. In some embodiments, one or more visual metrics and information from sensors of the mixed reality system are used to determine whether the lighting and/or texture of the mixed reality environment are sufficient (e.g., sufficient texture is determined from objects of a mixed reality environment; sufficient lighting in a mixed reality environment is determined). For example, a sensor of a MR system may be used to capture lighting and/or texture information associated with a mixed reality environment and the captured information may be compared with a lighting and/or texture threshold to determine if the lighting and/or texture is sufficient. If the lighting and/or texture are determined to be not sufficient, then the second IMU may be used for preintegration term calculations (e.g., for better accuracy, to reduce potential jitter and/or drift), as disclosed herein. In some embodiments, computations with one IMU and computations with two IMUs are compared, and if the differences between the computations are within a threshold, then using one IMU for SLAM computation may be sufficient in these instances. As an exemplary advantage, the ability to use one IMU in situations when lighting and/or texture of a mixed reality environment are determined to be sufficient may reduce power consumption and reduce computation time.

In some embodiments, a second IMU may enable repeated measurements to be taken of the same value, which may increase confidence in the measured value. For example, a first IMU may measure a first angular velocity, and a second IMU may measure a second angular velocity at the same time.

The first IMU and the second IMU are may be coupled to a same rigid body (e.g., the body experiences negligible deformation; the body may be a frame of a wearable head device). The first angular velocity associated with the first IMU and the second angular velocity associated with the second IMU can both be measurements of the same ground-truth angular velocity. In some embodiments, repeated measurements of the same value can produce a more accurate estimation of the ground-truth value by canceling out noise in each individual measurement. In some embodiments, coupling the two IMUs to a same rigid body may facilitate SLAM computations in a two-IMU system, as described herein. Because low-latency can be of high importance to SLAM calculations, it can be desirable to develop systems and methods of incorporating additional inertial information in a computationally efficient manner while preserving the accuracy gains of the additional data.

Figure 9:
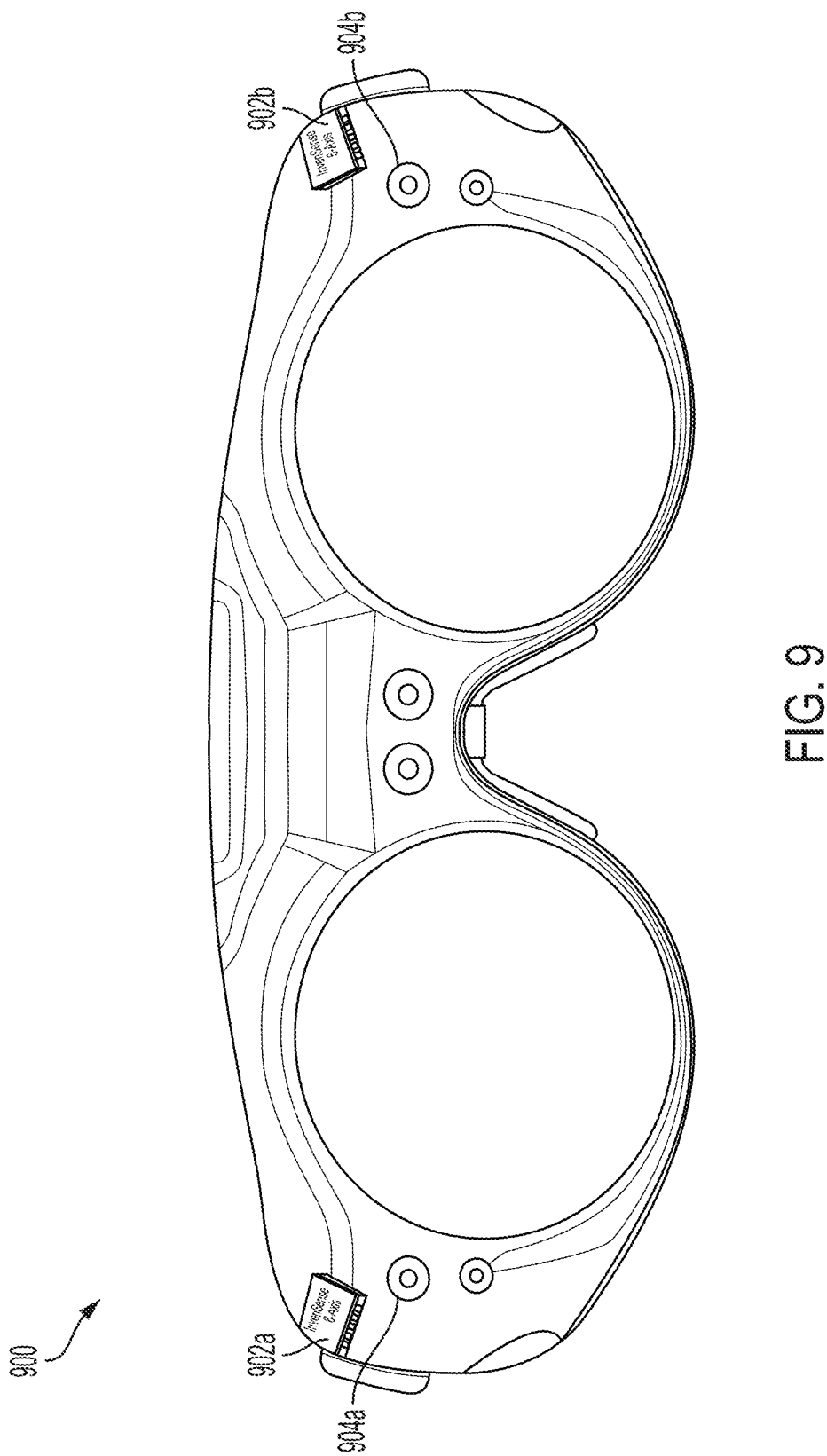
FIG. 9 illustrates an exemplary IMU configuration, according to one or more embodiments of the disclosure.

FIG. 9 illustrates an exemplary IMU configuration in a mixed reality system, according to some embodiments. In some embodiments, MR system 900 (which can correspond to MR systems 112, 200) can be configured to include IMU 902*a* and IMU 902*b*. In some embodiments, the IMUs 902*a* and 902*b* rigidly coupled to the mixed reality system (e.g., attached to a frame of the mixed reality system) such that the velocities of the IMUs are coupled. For example, the relationship between the two velocities may be computed using known values, such as angular velocity and vectors associated with the respective IMU positions. As described herein, a system comprising two velocity-coupled IMU may advantageously reduce the complexity of computation of preintegration terms associated with the system while generally observing better computational accuracy compared to a one-IMU system, particularly in low light and/or low texture situations in a mixed reality environment.

In some embodiments, MR system 900 can be configured such that IMU 902*a* is as close as possible to camera 904*a*, and that IMU 902*b* is as close as possible to camera 904*b*. In some embodiments, cameras 904*a* and 904*b* can be used for SLAM (e.g., cameras 904*a* and 904*b* can be used for object/edge recognition and/or for visual components of VIO). It can be desirable to configure MR system 900 such that an IMU is as close as possible to a SLAM camera so as to accurately track movement experienced by a SLAM camera (e.g., by using a movement of an IMU as a proxy for a movement of a SLAM camera).

Figure 10:
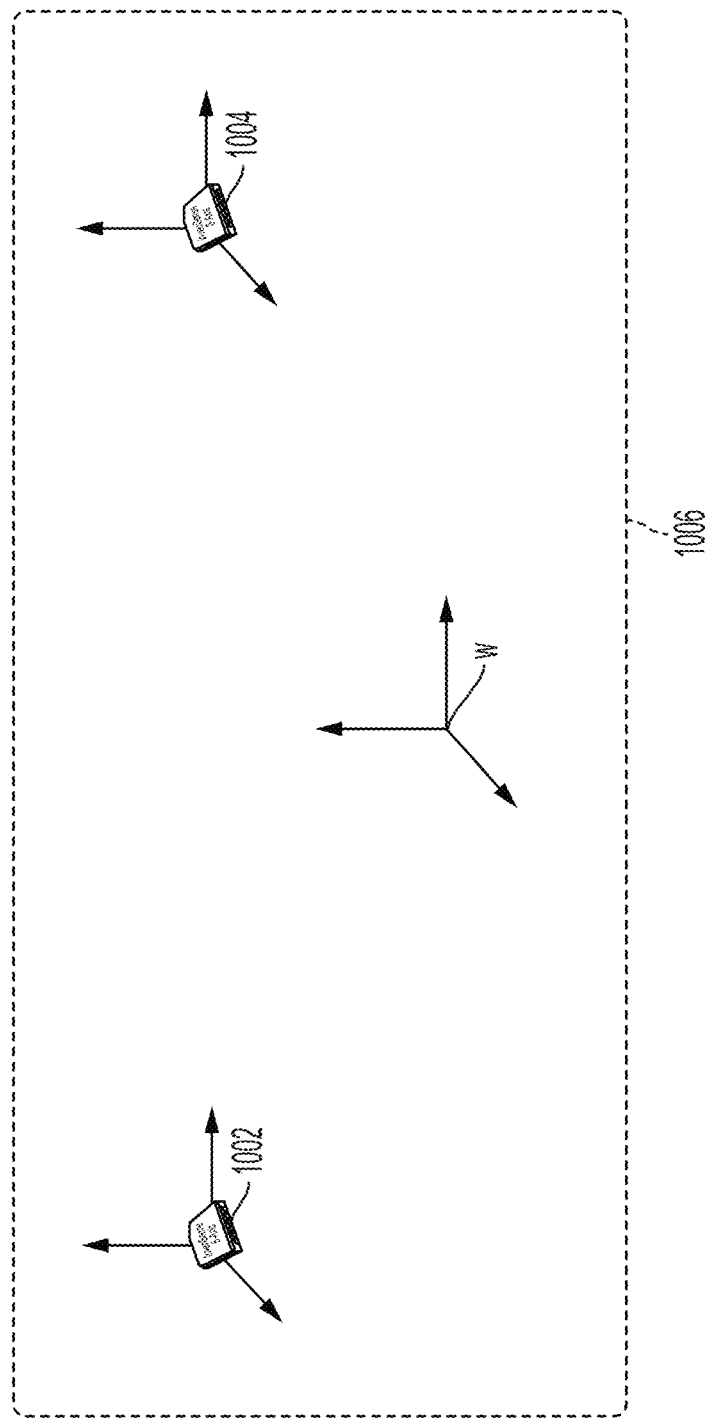
FIG. 10 illustrates an exemplary IMU configuration, according to one or more embodiments of the disclosure.

FIG. 10 illustrates an exemplary IMU configuration in a mixed reality system, according to some embodiments. In some embodiments, two IMU sensors (e.g., IMU 1002 and IMU 1004) can generally provide two IMU term edges and/or preintegration terms. For example, components of a preintegration term associated with IMU 1002 can be represented by equations (1), (2), and (3), where $R_{wT_1}(t+\Delta t)$ can represent a quaternion (which may represent a rotation and/or an orientation of a MR system) corresponding to IMU 1002, where $\omega_{WT_1}^{T_1}(t)$ can represent an angular velocity measured by IMU 1002 about a point W (which may exist on a MR system and/or be a center of a MR system), where $v_1^W(t+\Delta t)$ can represent a linear velocity at IMU 1002 relative to point W, where $a_1^W(t)$ can represent a linear acceleration at IMU 1002 relative to point W, and where $p_1^W(t+\Delta t)$ can represent a location of IMU 1002 relative to point W.

$$R_{WT_1}(t + \Delta t) = R_{WT_1}(t)\text{Exp}(\omega_{WT_1}^{I_1}(t)\Delta t) \quad \text{Equation (1)}$$

$$v_1^W(t + \Delta t) = v_1^W(t) + a_1^W(t)\Delta t \quad \text{Equation (2)}$$

$$p_1^W(t + \Delta t) = p_1^W(t) + v_1^W(t)\Delta t + \frac{1}{2}a_1^W(t)\Delta t^2 \quad \text{Equation (3)}$$

Similarly, equations (4), (5), and (6) can represent components of a preintegration term associated with IMU 1004.

$$R_{WT_2}(t + \Delta t) = R_{WT_2}(t)\text{Exp}(\omega_{WT_2}^{I_2}(t)\Delta t) \quad \text{Equation (4)}$$

$$v_2^W(t + \Delta t) = v_2^W(t) + a_2^W(t)\Delta t \quad \text{Equation (5)}$$

$$p_2^W(t + \Delta t) = p_2^W(t) + v_2^W(t)\Delta t + \frac{1}{2}a_2^W(t)\Delta t^2 \quad \text{Equation (6)}$$

Although t and Δt are used to described a respective IMU's rotation, angular velocity, and angular acceleration at a particular time, it is understood that the different quantities may not captured at exactly a same time. For example, due to hardware timing, there may be a delay between data capture or sampling between the two IMUs (e.g., 200 ms). In these instances, the MR system may synchronize the sets of data between the two IMU to account for this delay. As another example, IMU data associated with the different quantities may be sampled or captured at different times during a same clock cycle of the system. The period of the clock cycle may be determined by the system's timing resolution requirements.

In some embodiments, a solution for the equations (1)-(6) may be solved to compute preintegration terms associated with the first and second IMUs. For example, the solution may be using regression analysis (e.g., least square) or other suitable methods to reduce error associated with the solution of the system of equations.

In some embodiments, a preintegration term associated with IMU 1002 and a preintegration term associated with IMU 1004 can be kinematically constrained if IMU 1002 and IMU 1004 are rigidly coupled to each other (e.g., via rigid body 1006, which can correspond to MR system 900). In these instances, variables associated with equations (1)-(6) may be reduced due to this coupling. In some embodiments, a rigid coupling between IMU 1002 and IMU 1004 can allow both preintegration terms to be expressed in the same variables. Equation (7) can represent a relationship between variables measured at IMU 1002 and variables measured at IMU 1004 (due to rigid coupling), where $\overrightarrow{I_1 I_2}$ can represent a positional relationship (e.g., a vector) between IMU 1002 and IMU 1004 and ω can represent an angular velocity associated with the mixed reality system (e.g., angular velocity associated with IMU 1002, angular velocity associated with IMU 1004, average angular velocity associated with IMU 1002 and IMU 1004, a noise-reduced angular velocity associated with the system, a bias-removed angular velocity associated with the system).

$$v_2^W = v_1^W + \omega \times \overrightarrow{I_1 I_2} \quad \text{Equation (7):}$$

Using the kinematic relationship between IMU 1002 and IMU 1004, equations (8), (9), and (10) can replace equations (4), (5), and (6) as components of a preintegration term for IMU 1004.

$$R_{WT_2}(t + \Delta t) = R_{WT_2}(t)\text{Exp}(\omega_{WT_2}^{I_2}(t)\Delta t) \quad \text{Equation (8)}$$

$$v_1^W(t + \Delta t) + R_{WT_1}(t + \Delta t)\omega_{WT_1}^{I_1}(t + \Delta t) \times \overrightarrow{I_1 I_2} = \quad \text{Equation (9)}$$
$$v_1^W(t) + R_{WT_1}(t)\omega_{WT_1}^{I_1}(t) \times \overrightarrow{I_1 I_2} + a_2^W(t)\Delta t$$

$$p_2^W(t + \Delta t) = \quad \text{Equation (10)}$$
$$p_2^W(t) + [v_1^W(t) + R_{WT_1}(t)\omega_{WT_1}^{I_1}(t) \times \overrightarrow{I_1 I_2}]\Delta t + \frac{1}{2}a_2^W(t)\Delta t^2$$

As exemplified above, by rigidly coupling IMU 1002 and IMU 1004, a relationship between the two IMUs may be derived (e.g., using equation (7)), and a set of IMU equations (e.g., equations (4), (5), and (6)) associated with an IMU preintegration term may be advantageously simplified (e.g., to equations (8), (9), and (10)) to reduce complexity of computation of preintegration terms associated with the two IMUs while generally observing better computational accuracy compared to a one-IMU system.

Although equations (4), (5), and (6) are simplified in terms of the first IMU, it is understood that equations (1), (2), and (3) may be simplified (e.g., in terms of the second IMU) in instead to perform a similar calculation. Although the angular velocity associated with IMU 1002 is used in equations (8), (9), and (10), it is understood that a different angular velocity associated with the mixed reality system may be used for calculating preintegration terms. For example, an average angular velocity between IMU 1002 and IMU 1004 may be used in equations (8), (9), and (10).

The rigidity of the IMUs' (e.g., IMU 902a, IMU 902b, IMU 1002, IMU 1004) coupling the MR system may change over time. For example, mechanisms used to attach the IMUs to a frame of the MR system may experience plastic or inelastic deformations. These deformations may affect the mathematical relationship between the two IMUs. Specifically, these deformations may affect the accuracy of equation (7), and the accuracy of the relationship between the set of equations associated with a first IMU (e.g., IMU 902a, IMU 1002) and the set of equations associated with a second IMU (e.g., IMU 902b, IMU 1004) derived from equation (7). These deformation may affect the accuracy of preintegration terms associated with the IMUs. In some embodiments, the position of the IMUs may be calibrated prior to SLAM computation. For example, prior to a SLAM computation, a current position of an IMU (e.g., obtained by using sensors of the MR system) may be compared with a predetermined value (e.g., a known IMU position, an ideal IMU position, a manufactured IMU position), and the difference (e.g., an offset) may be accounted for in the SLAM computation (e.g., removing the difference in equation (7)). By calibrating the IMUs prior to a SLAM computation and accounting for potential deformations in IMU couplings, accuracy associated preintegration term and SLAM computations may be advantageously increased.

Figure 11:
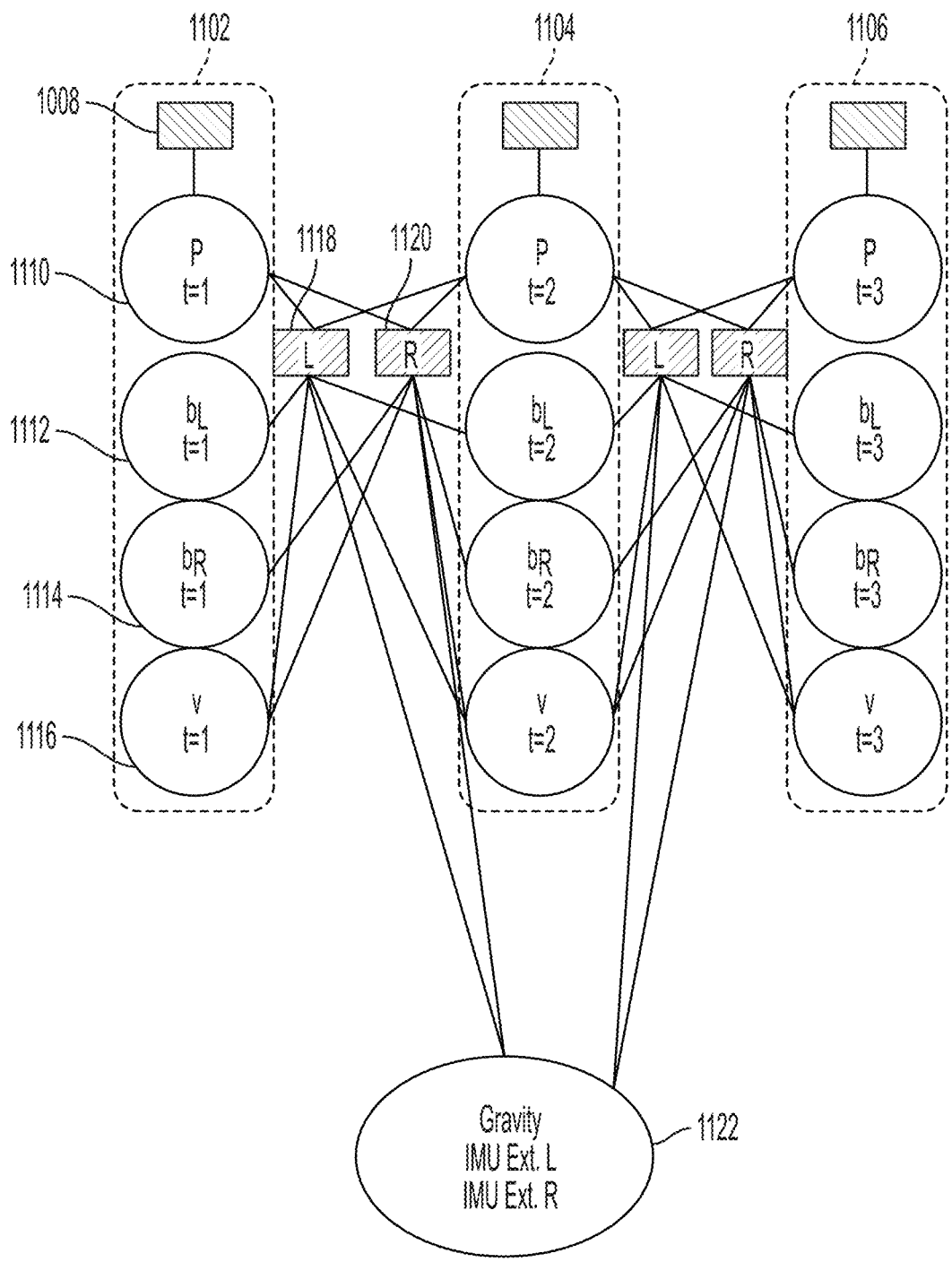
FIG. 11 illustrates an exemplary graphical representation of SLAM computations, according to one or more embodiments of the disclosure.

FIG. 11 illustrates an exemplary graphical representation of SLAM, according to some embodiments. The graphical representation in FIG. 11 can depict a non-linear factorization of a function of several variables. For example, variables (e.g., 1110, 1112, 1114, 1116, and 1122) can be represented as circular nodes, and functions of variables (e.g., 1102, 1118, and 1120, also called factors) can be represented as square nodes. Each factor can be a function of any (or all) attached variables.

In some embodiments, state 1102 can represent a system state (e.g., a state of an MR system) and/or any variables in the system state at time t=1. Similarly, state 1104 can represent a system state and/or any variables in the system state at time t=2, and state 1106 can represent a system state and/or any variables in the system state at time t=3. A system state can correspond to a keyrig captured at that time. A system state can include (and/or be defined by) the state of one or more variables within the state. For example, state 1102 can include PnP term 1108. In some embodiments, state 1102 can include pose estimate 1110. In some embodiments, state 1102 can include bias term 1112 of a first (and/or left) IMU (which can correspond to IMU 902*a* or IMU 1002). In some embodiments, bias term 1112 can include a bias value for a linear accelerometer and a gyroscope. In some embodiments, bias term 1112 can include a bias value for each linear accelerometer and gyroscope corresponding to individual measurements axes. In some embodiments, state 1102 can include bias term 1114 of a second (and/or right) IMU (which can correspond to IMU 902*b* or IMU 1004). Bias term 1114 can include similar corresponding bias values as bias term 1112. In some embodiments, state 1102 can include velocity term 1116. Velocity term 1116 can include an angular velocity of the system. In some embodiments, if the system is substantially a rigid body, the angular velocity may be one of angular velocity associated with the first IMU, angular velocity associated with the second IMU, average angular velocity associated with the first and second IMUs, a noise-reduced angular velocity associated with the system, and a bias-removed angular velocity associated with the system. In some embodiments, velocity term 1116 can include one or more linear velocity values corresponding to one or more locations in the system (e.g., a linear velocity value at each IMU in the system). In some embodiments, state 1102 can include stateless term 1122. Stateless term 1122 can include one or more variables that may not depend on a particular state. For example, stateless term 1122 can include a gravity variable, which may include an estimated direction of gravity. In some embodiments, stateless term 1122 can include IMU extrinsics (e.g., a relative position of IMU 904*a* or IMU 1002 and/or 904*b* or 1004 within MR system 900).

In some embodiments, two preintegration terms can relate two system states to each other. For example, preintegration term 1118 and preintegration term 1120 can relate state 1102 to state 1104. In some embodiments, preintegration term 1118 (which can correspond to IMU 904*a* or IMU 1002) and preintegration term 1120 (which can correspond to IMU 904*b* or IMU 1004) can be functions of the same sets of variables. This structuring of a non-linear optimization calculation can provide several advantages. For example, the second preintegration term (as compared to a non-linear factorization using a single IMU in FIG. 8) may not require a proportional increase in compute power because the second preintegration term may be kinematically constrained to the first preintegration term, as described herein. However, adding data from a second IMU can yield improvements in jitter and/or drift as compared to single IMU factorizations.

Figure 12:
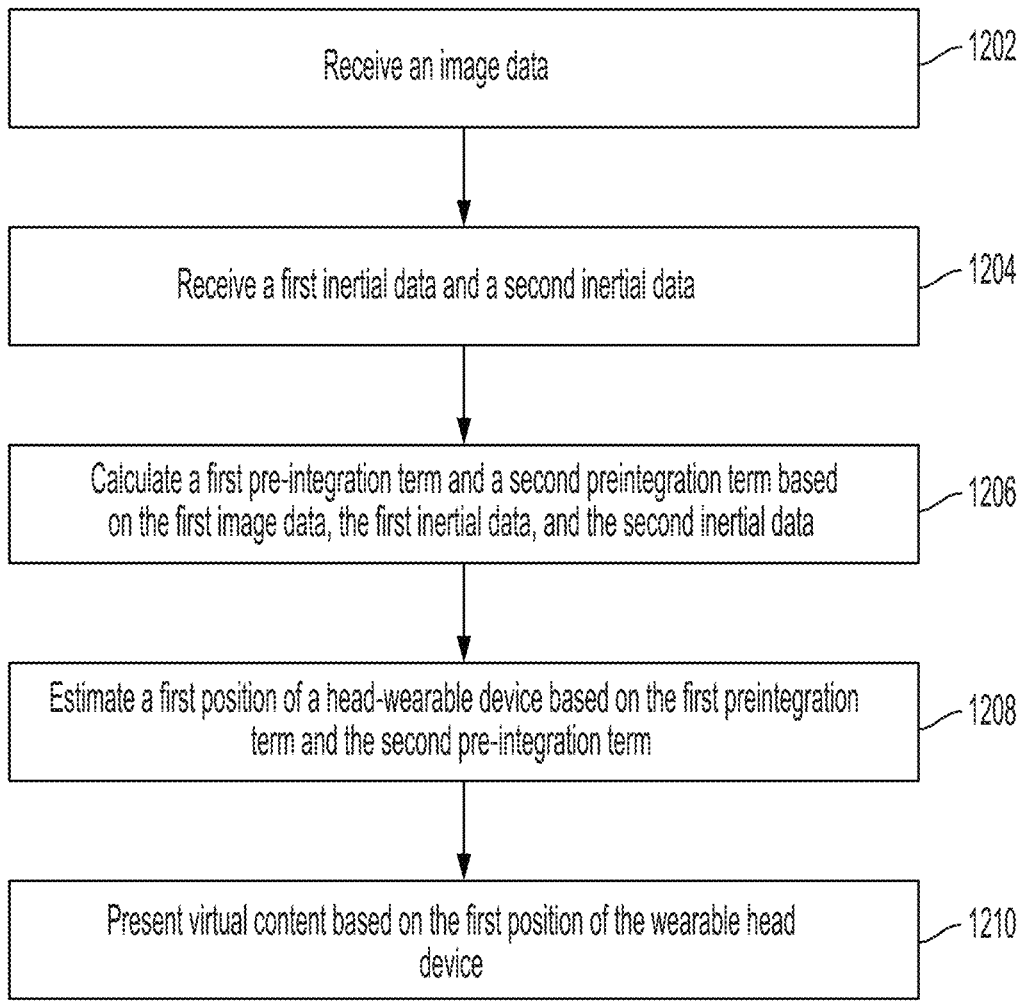
FIG. 12 illustrates an exemplary process for presenting virtual content, according to one or more embodiments of the disclosure.

FIG. 12 illustrates an exemplary process for presenting virtual content, according to some embodiments. For brevity, examples associated steps of the method described with respect to FIGS. 9-11 will not be described again here. At step 1202, image data can be received (e.g., via a sensor of a MR system). The image data can comprise a picture and/or visual features (e.g., edges).

At step 1204, first inertial data can be received via a first inertial measurement unit (e.g., IMU 902*a*, IMU 1002), and second inertial data can be received via a second inertial measurement unit (e.g., IMU 902*b*, IMU 1004). In some embodiments, the first inertial measuring unit and the second inertial measuring unit can be coupled together via a rigid body. The rigid body can be a body configured to not deform under normal use (e.g., composed of stiff plastic, metal, etc.). The first inertial data and/or the second inertial data can include one or more linear acceleration measurements (e.g., three measurements along each of three measurement axes) and/or one or more angular velocity measurements (e.g., three measurements along each of three measurement axes). In some embodiments, the first inertial data and/or the second inertial data can include linear velocity measurements and/or angular acceleration measurements.

At step 1206, a first preintegration term and a second preintegration term can be calculated based on the image data, the first inertial data, and the second inertial data. In some embodiments, the first preintegration term and the second preintegration term can be calculated using a graphical optimization of non-linearly related variables and functions. For example, a factor graph depicted in FIG. 11 can be used to calculate the first preintegration term (e.g., preintegration term 1118) and the second preintegration term (e.g., preintegration term 1120). In some embodiments, optimizing a factor graph and/or calculating functions in a factor graph can involve fixing some variables while optimizing for others.

At step 1208, a position of the wearable head device can be estimated based on the first preintegration term and the second preintegration term. In some embodiments, the position can be estimated using a graphical optimization of non-linearly related variables and functions. For example, a factor graph depicted in FIG. 11 can be used to estimate the position (e.g., pose term 1110). In some embodiments, optimizing a factor graph and/or calculating functions in a factor graph can involve fixing some variables while optimizing for others.

At step 1210, virtual content can be presented based on the position. In some embodiments, virtual content can be presented via one or more transmissive displays of a wearable head device, as described herein. In some embodiments, a MR system may estimate a user's field of view based on the position. If it is determined that virtual content is in the field of view of the user, virtual content can be presented to the user.

In some embodiments, keyrigs are separated by a time interval. For example, as described with respect to FIGS. 6A, 6B, 8, and 11, adjacent keyrigs (e.g., t=0 and t=1, t=1 and t=2, etc.; i=0 and i=1, i=1 and i=2, etc.; functions of variables 1102 and 1104, functions of variables 1104 and 1106, etc.) are separated by respective time intervals. The respective time intervals may be different (e.g., the time when a keyrig is generated may be determined by the system). In some examples, when a time interval between keyrigs is greater than a maximum time interval (e.g., 5 seconds), benefits of using pre-integration (e.g., node 606, node 804, pre-integration terms 1118, 1120) for visual-inertial bundle adjustment may be reduced (e.g., reduced accuracy compared to using pre-integration when adjacent keyrigs are less than the maximum time interval, reduced accuracy compared to not using pre-integration when adjacent keyrigs are greater than the maximum time interval). Therefore, it may be desirable to not use pre-integration for bundle adjustment when benefits of pre-integration are reduced.

In some embodiments, the system (e.g., mixed reality system 112, mixed reality system 200, mixed reality system in FIG. 4, mixed reality system 900) determines whether a time interval between keyrigs is greater than a maximum time interval (e.g., 5 seconds). Based on this determination, the system determines whether to use pre-integration for bundle adjustment corresponding to the adjacent keyrigs. As an exemplary advantage, bundle adjustment accuracy is optimized (e.g., improved accuracy compared to using pre-integration when adjacent keyrigs are greater than the maximum time interval, improved accuracy compared to using pre-integration when adjacent keyrigs are greater than the maximum time interval and no weight is adjusted) by forgoing using pre-integration when pre-integration is less accurate (e.g., when a time interval between adjacent keyrigs is greater than a maximum time interval). In some embodiments, as another exemplary advantage, by forgoing pre-integration when pre-integration is less accurate, bundle adjustment accuracy may be optimized without any weight adjustment and reducing computing time and resource needs.

In some embodiments, in accordance with a determination that the time interval is not greater than the maximum time interval, the system uses pre-integration for bundle adjustment. For example, when the time interval is not greater than the maximum time interval, visual-inertial bundle adjustment, as described herein, is performed.

In some embodiments, in accordance with a determination that the time interval is greater than the maximum time interval, the system forgoes using pre-integration for bundle adjustment. For example, when the time interval is greater than the maximum time interval, spatial bundle adjustment, as described herein, is performed (e.g., instead of visual-inertial bundle adjustment); methods including this step may be known as hybrid visual-inertial bundle adjustment. As another example, when the time interval is greater than the maximum time interval, visual-inertial bundle adjustment is performed, but the corresponding pre-integration term (e.g., node 606, node 804, pre-integration terms 1118, 1120) is not added to a graph, as described with respect to FIGS. 6A, 6B, 8, and 11; methods including this step may be known as partial visual-inertial bundle adjustment.

Techniques and methods described herein with respect to FIG. 11 and dual IMUs can also be applied in other respects. For example, dual IMU data can be used in VIO methods described with respect to FIGS. 6A-6B. Dual IMU data can also be used for gravity estimation methods described with respect to FIG. 8. For example, a second preintegration term can be added to the graphical optimizations in FIGS. 6A-6B and/or FIG. 8, as well as variables for the biases of each IMU.

Although graphical optimizations (for example, optimizations depicted in FIGS. 6A-6B, 8, and/or 11) may depict variable nodes including one or more variable values, it is contemplated that variable values within variable nodes can be represented as one or more individual nodes. Although techniques and methods described herein disclose a dual IMU graphical optimization structure, it is contemplated that similar techniques and methods can be used for other IMU configurations (such as three IMUs, four IMUs, ten IMUs, etc.). For example, a graphical optimization model may include a preintegration term for each IMU, which may be a function of a pose estimate, one or more bias terms (corresponding to each IMU), velocity, gravity direction, and one or more IMU extrinsic values corresponding to each IMU.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method comprising:
receiving, via a sensor of a wearable head device, first image data and second image data;
receiving, via a first inertial measurement unit (IMU) of the wearable head device, first inertial data and third inertial data;
receiving, via a second IMU of the wearable head device, second inertial data and fourth inertial data;
calculating a first preintegration term based on the first image data and based further on one or more of the first inertial data and the second inertial data;
calculating a second preintegration term based on the second image data and based further on one or more of the third inertial data and the fourth inertial data;
estimating a position of the wearable head device based on a combination of the first preintegration term and the second preintegration term; and
presenting virtual content, via a display of the wearable head device, based on the estimated position of the wearable head device.

2. The method of claim 1, wherein the first preintegration term is calculated based further on a bias of the first IMU.

3. The method of claim 1, wherein:
the first preintegration term is calculated based further on a positional relationship between the first IMU and the second IMU.

4. The method of claim 3, wherein the positional relationship is determined based on an average linear velocity of the first IMU and based further on an average linear velocity of the second IMU.

5. The method of claim 1, wherein the first preintegration term is calculated based on one or more of a linear velocity of the first IMU and a linear velocity of the second IMU.

6. The method of claim 1, wherein:
the first inertial data comprises angular velocity data associated with the first IMU and linear acceleration data associated with the first IMU, and
the second inertial data comprises angular velocity data associated with the second IMU and linear acceleration data associated with the second IMU.

7. The method of claim 1, wherein the first preintegration term relates a first state of the wearable head device to a second state of the wearable head device, and wherein each of the first state and the second state comprises one or more of respective position data, respective velocity data, respective accelerometer bias data, and respective gyroscope bias data.

8. The method of claim 1, wherein calculating the first preintegration term comprises generating a factorized graphical model.

9. The method of claim 1, wherein the first preintegration term is associated with the first IMU.

10. The method of claim 1, further comprising determining an offset associated with one or more of the first inertial data and the second inertial data, wherein calculating the first preintegration term is based further on the offset.

11. The method of claim 1, wherein the first IMU and the second IMU are rigidly coupled to the wearable head device.

12. The method of claim 1, further comprising determining, via a second sensor of the wearable head device, one or more of a light level and a texture level associated with a mixed reality environment, wherein:

the position of the wearable head device comprises a position of the wearable head device with respect to the mixed reality environment, and one or more of said receiving the second inertial data, said calculating the first preintegration term, said estimating the position of the wearable head device based on the first preintegration term, and said presenting virtual content based on the position of the wearable head device are performed in accordance with a determination that the one or more of the light level and the texture level are below a threshold level.

13. The method of claim 1, further comprising:

estimating a second position of the wearable head device based on the second preintegration term, and presenting second virtual content, via the display of the wearable head device, based on the estimated second position of the wearable head device.

14. A system comprising:

a sensor of a wearable head device;

a first inertial measurement unit (IMU) of the wearable head device;

a second IMU of wearable head device;

a display of the wearable head device; and one or more processors configured to perform a method comprising:

receiving, via the sensor, first image data and second image data;

receiving, via the first IMU, first inertial data and third inertial data;

receiving, via the second IMU, second inertial data and fourth inertial data;

calculating a first preintegration term based on the first image data and based further on one or more of the first inertial data and the second inertial data;

calculating a second preintegration term based on the second image data and based further on one or more of the third inertial data and the fourth inertial data;

estimating a position of the wearable head device based on a combination of the first preintegration term and the second preintegration term; and presenting, on the display, virtual content based on the estimated position of the wearable head device.

15. The system of claim 14, wherein the first preintegration term is calculated based further on a bias of the first IMU.

16. The system of claim 14, wherein the first preintegration term is calculated based further on one or more of a linear velocity of the first IMU and a linear velocity of the second IMU.

17. The system of claim 14, wherein the first IMU and the second IMU are rigidly coupled to the wearable head device.

18. The system of claim 14, wherein the method further comprises:

estimating a second position of the wearable head device based on the second preintegration term, and presenting, on the display, second virtual content based on the estimated second position of the wearable head device.

19. A non-transitory computer-readable medium storing instructions that, when executed by one or more processors, cause the one or more processors to perform a method comprising:

receiving, via a sensor of a wearable head device, first image data and second image data;

receiving, via a first inertial measurement unit (IMU) of the wearable head device, first inertial data and third inertial data;

receiving, via a second IMU of the wearable head device, second inertial data and fourth inertial data;

calculating a first preintegration term based on the first image data and based further on one or more of the first inertial data and the second inertial data;

calculating a second preintegration term based on the second image data and based further on one or more of the third inertial data and the fourth inertial data;

estimating a position of the wearable head device based on a combination of the first preintegration term and the second preintegration term; and presenting virtual content based on the estimated position of the wearable head device.

20. The non-transitory computer-readable medium of claim 19, wherein the method further comprises:

estimating a second position of the wearable head device based on the second preintegration term, and presenting second virtual content based on the estimated second position of the wearable head device.

* * * * *